United States Patent
Boloorian et al.

(10) Patent No.: US 12,019,185 B2
(45) Date of Patent: Jun. 25, 2024

(54) CONCURRENT LIDAR MEASUREMENTS OF A REGION IN A FIELD OF VIEW

(71) Applicant: SiLC Technologies, Inc., Monrovia, CA (US)

(72) Inventors: Majid Boloorian, San Diego, CA (US); Mehdi Asghari, La Canada Flintridge, CA (US); Dazeng Feng, El Monte, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 320 days.

(21) Appl. No.: 16/848,818

(22) Filed: Apr. 14, 2020

(65) Prior Publication Data

US 2020/0333443 A1    Oct. 22, 2020

Related U.S. Application Data

(60) Provisional application No. 62/834,910, filed on Apr. 16, 2019.

(51) Int. Cl.
*G01S 7/48* (2006.01)
*G01S 7/481* (2006.01)
*G06F 17/14* (2006.01)

(52) U.S. Cl.
CPC .......... *G01S 7/4815* (2013.01); *G01S 7/4808* (2013.01); *G06F 17/14* (2013.01)

(58) Field of Classification Search
CPC .... G01S 7/4815; G01S 7/4808; G01S 7/4812; G01S 7/4818; G01S 7/4911; G01S 17/34; G01S 17/58; G06F 17/14
See application file for complete search history.

(56) References Cited

U.S. PATENT DOCUMENTS

| | | |
|---|---|---|
| 9,157,790 B2 | 10/2015 | Shpunt et al. |
| 11,378,691 B2 | 7/2022 | Boloorian et al. |
| 11,536,805 B2 | 12/2022 | Asghari et al. |

(Continued)

FOREIGN PATENT DOCUMENTS

| | | |
|---|---|---|
| JP | 5975203 B2 | 8/2016 |
| JP | 2017-198514 A | 11/2017 |
| WO | 2018036946 A1 | 3/2018 |

OTHER PUBLICATIONS

Baghmisheh, B. B., "Chip-scale Lidar" University of California, Berkeley, Jan. 19, 2017, Technical Report No. UCB/EECS-2017-4, http://www2.eecs.berkeley.edu/Pubs/TechRpts/2017/EECS-2017-4.html.

(Continued)

*Primary Examiner* — Catherine T. Rastovski
*Assistant Examiner* — Lal C Mang
(74) *Attorney, Agent, or Firm* — Gavrilovich, Dodd & Lindsey LLP

(57) ABSTRACT

A LIDAR system concurrently outputs multiple LIDAR output signals that concurrently illuminate the same sample region in a field of view for a data period. The sample region is one of multiple sample regions included in the field of view. The LIDAR system also includes electronics that use the multiple LIDAR output signals to generate LIDAR data for the sample region. The LIDAR data includes a distance and/or a radial velocity between the LIDAR system and an object that reflects the LIDAR output signals.

24 Claims, 13 Drawing Sheets

(56) References Cited

U.S. PATENT DOCUMENTS

| | | |
|---|---|---|
| 2007/0103362 A1 | 5/2007 | Arikan et al. |
| 2012/0081786 A1 | 4/2012 | Mizuyama et al. |
| 2012/0182544 A1 | 7/2012 | Asahara et al. |
| 2013/0051655 A1 | 2/2013 | Collard et al. |
| 2013/0321791 A1 | 12/2013 | Feldkhun et al. |
| 2014/0035776 A1 | 2/2014 | Sochen et al. |
| 2016/0223663 A1* | 8/2016 | Schmalenberg ...... G01S 13/865 |
| 2016/0306043 A1* | 10/2016 | Moss ...................... G01S 17/08 |
| 2016/0377721 A1 | 12/2016 | Lardin et al. |
| 2017/0146639 A1 | 5/2017 | Carothers |
| 2018/0003805 A1 | 1/2018 | Popovich et al. |
| 2018/0113216 A1 | 4/2018 | Kremer et al. |
| 2018/0164408 A1* | 6/2018 | Hall ....................... G01S 17/936 |
| 2019/0011558 A1* | 1/2019 | Crouch ................. G01S 17/102 |
| 2019/0025426 A1 | 1/2019 | Satyan et al. |
| 2019/0086514 A1 | 3/2019 | Dussan et al. |
| 2019/0086518 A1* | 3/2019 | Halstig ................. G01S 7/4817 |
| 2019/0086550 A1 | 3/2019 | Dussan et al. |
| 2019/0179012 A1* | 6/2019 | Heo ....................... G01S 13/345 |
| 2019/0187269 A1 | 6/2019 | Tong et al. |
| 2019/0204441 A1 | 7/2019 | Feneyrou et al. |
| 2019/0293794 A1* | 9/2019 | Zhang ................... G01S 7/4817 |
| 2019/0346568 A1 | 11/2019 | Feng et al. |
| 2019/0353789 A1 | 11/2019 | Boloorian et al. |
| 2019/0369244 A1 | 12/2019 | Asghari et al. |
| 2019/0369251 A1 | 12/2019 | Feng et al. |
| 2019/0391242 A1 | 12/2019 | Asghari et al. |
| 2020/0018857 A1 | 1/2020 | Feng et al. |
| 2020/0025926 A1 | 1/2020 | Asghari et al. |
| 2020/0057143 A1 | 2/2020 | Asghari et al. |
| 2020/0116837 A1 | 4/2020 | Asghari et al. |
| 2020/0200879 A1* | 6/2020 | Halstig ................. G01S 7/4817 |
| 2020/0249324 A1* | 6/2020 | Steinberg .............. G01S 7/4817 |
| 2020/0292706 A1* | 9/2020 | Hexsel ................... G01S 17/58 |

OTHER PUBLICATIONS

Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.

Goodman, J., "Speckle Phenomena in Optics", Roberts and Company, 2007.

Issakov, V., (2010), Radar Systems, Ch. 2. In Microwave Circuits for 24GHz Automotive Radar in Silicon-based Technologies. Berlin Heidelberg: Springer-Verlag.

Kang, Sung Chul, International Search Report and Written Opinion, PCT/US2019/043828, Korean Intellectual Property Office, dated Nov. 15, 2019.

Kirscher, Jerome, Extended European Search Report, Application No. 20756701.7, dated Oct. 6, 2022.

Li, L., "Time-of-Flight Camera—An Introduction", Jan. 2014, TI Technical White Paper SLOA190B.

Pierrottet et al., "Linear FMCW Laser Radar for Precision Range and Vector Velocity Measurements", MRS Online Proceeding Library Archive, Jan. 2008, pp. 1-9.

Thomas, Shane, International Search Report and Written Opinion, PCT/US2020/016455, U.S. Patent and Trademark Office, dated Jul. 23, 2020.

Wang et al., "Automotive FMCW Radar-enhanced Range Estimation via a Local Resampling Fourier Transform", International Journal of Advanced Robotic Systems, 2016, pp. 1-8.

Wittmann-Regis, Agnes, International Preliminary Report on Patentability and Written Opinion, PCT/US2019/043828, The International Bureau of WIPO, dated Mar. 11, 2021.

Wojtkiewicz et al., "Two-dimensional signal processing in FMCW radars", National Conference on Circuit Theory and Electronic Networks, vol. 2, Oct. 1997, pp. 1-6.

* cited by examiner

CONCURRENT LIDAR MEASUREMENTS OF A REGION IN A FIELD OF VIEW

RELATED APPLICATIONS

This application claims the benefit of U.S. Provisional Patent Application Ser. No. 62/834,910, filed on Apr. 16, 2019, entitled "Concurrent LIDAR Measurements of a Region in a Field of View", and incorporated herein in its entirety.

FIELD

The invention relates to optical devices. In particular, the invention relates to LIDAR systems.

BACKGROUND

LIDAR technologies are being applied to a variety of applications. LIDAR specifications typically specify that LIDAR data be generated for a minimum number of sample regions in a field of view. LIDAR specifications also specify the maximum distance of those sample regions from the LIDAR signal source and a re-fresh rate. The re-fresh rate is the frequency at which the LIDAR data is generated for the sample regions in the field of view. The ability of the given LIDAR system to generate the LIDAR data for the sample regions in the field of view becomes more difficult as the distance to the sample regions increases and as the refresh rate increases.

Many LIDAR systems include a LIDAR chip that transmits a LIDAR output signal. The LIDAR output signal is reflected by an object located off the LIDAR chip. The reflected LIDAR output signal serves as a LIDAR input signal that carries LIDAR data (distance and/or radial velocity between the source of the LIDAR output signal and the reflecting object) for the object. At least a portion of the LIDAR input signal is received by the LIDAR chip. The LIDAR input signal can then be processed so as extract the LIDAR data.

As LIDAR is being adapted to applications such as self-driving-vehicles, it becomes more desirable to reduce the time required to generate the LIDAR data each sample region. Reducing this time allows the re-fresh rate to be increased and allows the LIDAR system to be used with more demanding LIDAR applications.

SUMMARY

A LIDAR system is configured to output multiple LIDAR output signals that are each concurrently directed to one of multiple sample regions in a field of view. The LIDAR system is also configured to concurrently receive multiple LIDAR input signals that have each been reflected by an object located outside of the LIDAR system and within the sample region. The LIDAR input signals each includes light from a different one of the LIDAR output signals. The LIDAR system is configured to use the multiple LIDAR input signals to generate LIDAR data for the object. The LIDAR data indicates the distance and/or the radial velocity between the LIDAR system and the object.

Another embodiment of a LIDAR system outputs multiple LIDAR output signals that concurrently illuminate the same sample region in a field of view for a data period. The LIDAR receives multiple LIDAR input signals that have each been reflected by an object located outside of the LIDAR system but within the sample region. The LIDAR input signals each include light from one of the LIDAR output signals. The system also includes electronics that perform a mathematical transform on electrical signals that carry the LIDAR data from the LIDAR input signals. The transform outputs a single frequency solution for the object in the sample region.

Another method of operating a LIDAR system includes concurrently illuminating a sample region in a field of view with multiple LIDAR output signals for a data period. The method also includes receiving multiple LIDAR input signals that have each been reflected by an object located outside of the LIDAR system but within the sample region. The LIDAR input signals each includes light from one of the LIDAR input signals. The method further includes performing a mathematical transform on electrical signals that carry the LIDAR data from the LIDAR input signals such that the transform outputs a single frequency solution for the object in the sample region.

BRIEF DESCRIPTION OF THE FIGURES

FIG. 6A is a schematic of the processing unit.

FIG. 6B illustrates a schematic for an example of electronics that are suitable for use with a processing unit constructed according to FIG. 6A.

FIG. 6C illustrates the relationship between the frequencies associated with different channels in a data signal processed by a processing unit constructed according to FIG. 6A.

FIG. 7A is a schematic of the processing unit.

FIG. 7B illustrates the relationship between the frequencies associated with different channels in a data signal processed by the schematic of FIG. 7A.

FIG. 7C illustrates a schematic for an example of electronics that are suitable for use with a processing unit constructed according to FIG. 7A.

DESCRIPTION

A LIDAR system outputs multiple LIDAR output signals that each concurrently illuminates a single sample region in a field of view that includes multiple sample regions. The LIDAR output signals are reflected by one or more objects located in the sample region. The reflected LIDAR output signals serve as LIDAR input signals that return to the LIDAR system. The LIDAR input signals are processed so as to generate LIDAR data for the sample region.

Prior LIDAR systems illuminated a sample region with a series of different LIDAR output signals in order to generate the LIDAR data for that sample region. Using multiple different LIDAR output signals to illuminate the sample region at the same time shortens the amount of time required to generate the LIDAR data for the sample region. As a result, the re-fresh rate for the LIDAR system can be increased.

The LIDAR system uses the LIDAR input signals to generate electrical signals that carry the LIDAR data. The LIDAR data can be generated by performing a mathematical transform such as a Fourier transform to one or more of the electrical signals such that the transform outputs one or more frequency values that are each associated with a different reflecting object located in the sample region. The transforms used in prior LIDAR systems output multiple frequencies for each of the objects in a sample region. Under certain circumstances, it is unclear which one of several frequencies associated with a single object is the frequency that provides the correct results. The ability of the transform to output a single frequency associated with each object improves the accuracy and the reliability of the LIDAR system.

Figure 1A:
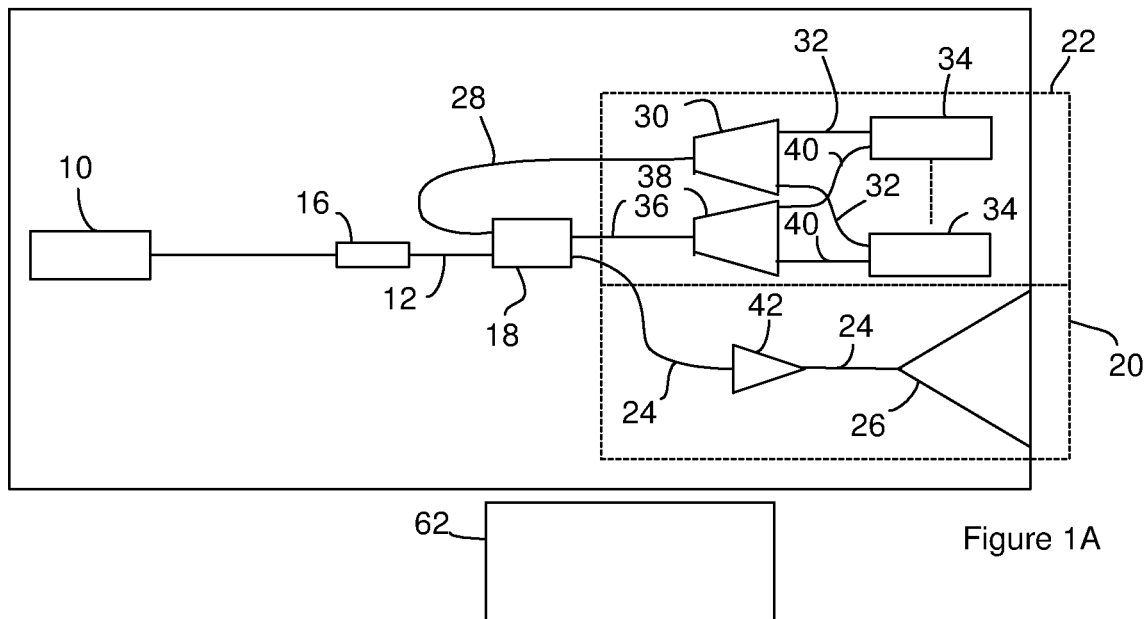
FIG. 1A is a schematic of a LIDAR system.

FIG. 1A is a schematic of a LIDAR system. The system includes a light source 10 such as a laser that outputs an outgoing LIDAR signal. The outgoing LIDAR signal includes multiple different channels that are each at a different wavelength. The wavelengths of the channels can be periodically spaced in that the wavelength increase from one channel to the next channel is constant or substantially constant. A suitable light source 10 for generating multiple channels with periodically spaced wavelengths includes, but is not limited to, comb lasers, multiple single wavelength lasers multiplexed into to single optical waveguide, sources such as that described in U.S. patent application Ser. No. 11/998,846, filed on Nov. 30, 2017, grated U.S. Pat. No. 7,542,641, entitled "Multi-Channel Optical Device," and incorporated herein in its entirety.

The LIDAR system also includes a utility waveguide 12 that receives an outgoing LIDAR signal from the light source 10. A modulator 14 is optionally positioned along the utility waveguide 12. The modulator 14 is configured to modulate the power of the outgoing LIDAR signal and accordingly the LIDAR output signal(s). The electronics can operate the modulator 14. Accordingly, the electronics can modulate the power of the outgoing LIDAR signal and accordingly the LIDAR output signal(s). Suitable modulators 14 include, but are not limited to, PIN diode carrier injection devices, Mach-Zehnder modulator devices, and electro-absorption modulator devices. When the modulator 14 is constructed on a silicon-on-insulator platform, a suitable modulator is disclosed in U.S. patent application Ser. No. 617,810, filed on Sep. 21, 1993, entitled Integrated Silicon PIN Diode Electro-Optic Waveguide, and incorporated herein in its entirety.

An amplifier 16 is optionally positioned along the utility waveguide 12. Since the power of the outgoing LIDAR signal is distributed among multiple channels, the amplifier 16 may be desirable to provide each of the channels with the desired power level on the utility waveguide 12. Suitable amplifiers include, but are not limited to, semiconductor optical amplifiers (SOAs).

The utility waveguide 12 carries the outgoing LIDAR signal from the modulator 14 to a signal-directing component 18. The signal-directing component 18 can direct the outgoing LIDAR signal to a LIDAR branch 20 and/or a data branch 22. The LIDAR branch outputs LIDAR output signals and receives LIDAR input signals. The data branch processes the LDAR input signals for the generation of LIDAR data (distance and/or radial velocity between the source of the LIDAR output signal and a reflecting object).

The LIDAR branch includes a LIDAR signal waveguide 24 that receives at least a portion of the outgoing LIDAR signal from the signal-directing component 18. The LIDAR signal waveguide 24 carries at least a portion of the outgoing LIDAR signal to an output component 26 through which the outgoing LIDAR signal exits from the LIDAR chip. When the outgoing LIDAR signal includes multiple different channels at different wavelengths, the output component 26 can be configured such that each of the different channels is incident on the same sample region in the field of view. For instance, the output component 26 can be configured such that each of the different channels travels away from the LIDAR chip in the same direction or in substantially the same direction.

After exiting from the output component 26, the different channels each serve as a LIDAR output signal where the LIDAR output signals are each at a different wavelength (channel). The LIDAR output signals can be reflected by a reflecting object (not shown) located outside of the LIDAR system. Each of the reflected LIDAR output signals returns to the output component 26 as a LIDAR input signal. The output component 26 receives the LIDAR input signals and outputs the result on the LIDAR signal waveguide 24 as an incoming LIDAR signal.

In some instances, the output component 26 also includes beam steering functionality. In these instances, the output component 26 can be in electrical communication with electronics (not shown) that can operate the output component 26 so as to steer the LIDAR output signals from one of the sample regions in a field of view to other sample regions in the field of view. The output component 26 and/or electronics can be configured such that the different LIDAR output signals are steered concurrently.

Although the output component 26 is illustrated as a single component, the output component 26 can include multiple optical components and/or electrical components. Suitable output components 26 include, but are not limited to, optical phased arrays (OPAs), transmission diffraction gratings, reflection diffraction gratings, and Diffractive Optical Elements (DOE). Suitable output components 26 with beam steering capability include, but are not limited to, optical phased arrays (OPAs) with active phase control elements on the array waveguides.

The LIDAR signal waveguide 24 carries the incoming LIDAR signal to the signal-directing component 18. The signal-directing component 18 directs the incoming LIDAR signal to the utility waveguide 12 and/or a comparative signal waveguide 28. The portion of the incoming LIDAR signal-directed to the comparative signal waveguide 28 serves a comparative incoming LIDAR signal.

The comparative signal waveguide 28 carries the comparative incoming LIDAR signal to a comparative demultiplexer 30. When the comparative light signal includes multiple channels, the comparative demultiplexer 30 divides the comparative incoming LIDAR signal into different comparative signals that each carries a different one of the channels. The comparative demultiplexer 30 outputs the comparative signals on different comparative waveguides 32. The comparative waveguides 32 each carry one of the comparative signals to different processing components 34. Accordingly, each of the different processing components 34 receives a comparative signal carrying a different one of the channels.

The signal-directing component 18 is configured such that when the signal-directing component 18 directs at least a portion of the incoming LIDAR signal to the comparative waveguide 32, the signal-directing component 18 also directs at least a portion of the outgoing LIDAR signal to a reference signal waveguide 36. The portion of the outgoing LIDAR signal received by the reference signal waveguide 36 serves as a reference light signal.

The reference signal waveguide 36 carries the reference light signal to a reference demultiplexer 38. When the reference light signal includes multiple channels, the reference demultiplexer 38 divides the reference light signal into different reference signals that each carries a different one of the channels. The reference demultiplexer 38 outputs the reference signals on different reference waveguides 40. The reference waveguides 40 each carry one of the reference signals to a different one of the processing components 34. Accordingly, each of the different processing components 34 receives a reference signal carrying a different one of the channels.

The comparative waveguides 32 and the reference waveguides 40 are configured such that a comparative signal and the corresponding reference signal are received at the same processing component 34. For instance, the comparative waveguides 32 and the reference waveguides 40 are configured such that the comparative signal and the corresponding reference signal of the same wavelength are received at the same processing component 34. Accordingly, the different processing components 34 each receives the comparative signal and the reference signal carrying the same channel.

As will be described in more detail below, each of the processing components 34 combines a comparative signal with the corresponding reference signal to form a composite signal that carries LIDAR data for a sample region on the field of view. Accordingly, the composite signal can be processed so as to extract LIDAR data for the sample region.

The signal-directing component 18 can be an optical coupler. When the signal-directing component 18 is an optical coupler, the signal-directing component 18 directs a first portion of the outgoing LIDAR signal to the LIDAR signal waveguide 24 and a second portion of the outgoing LIDAR signal to the reference signal waveguide 36 and also directs a first portion of the incoming LIDAR signal to the utility waveguide 12 and a second portion of the incoming LIDAR signal to the comparative signal waveguide 28.

Accordingly, the second portion of the incoming LIDAR signal can serve as the comparative incoming LIDAR signal and the second portion of the outgoing LIDAR signal can serve as the reference light signal.

The signal-directing component 18 can be an optical switch such as a cross-over switch. A suitable cross-over switch can be operated in a cross mode or a pass mode. In the pass mode, the outgoing LIDAR signal is directed to the LIDAR signal waveguide 24 and an incoming LIDAR signal would be directed to the utility waveguide 12. In the cross mode, the outgoing LIDAR signal is directed to the reference signal waveguide 36 and the incoming LIDAR signal is directed to the comparative signal waveguide 28. Accordingly, the incoming LIDAR signal or a portion of the incoming LIDAR signal can serve as the comparative light signal and the outgoing LIDAR signal or a portion of the outgoing LIDAR signal can serve as the reference light signal.

An optical switch such as a cross-over switch can be controlled by the electronics. For instance, the electronics can control operate the switch such that the switch is in the cross mode or a pass mode. When LIDAR output signals are to be transmitted from the LIDAR system, the electronics operate the switch such that the switch is in the pass mode. When LIDAR input signals are to be received by the LIDAR system, the electronics operate the switch such that the switch is in the cross-over mode. The use of a switch can provide lower levels of optical loss than are associated with the use of an optical coupler as the signal-directing component 18.

In the above descriptions of the operation of the signal-directing component 18, the comparative light signals and the reference light signals are concurrently directed to the data branch. As a result, the processing components 34 can each combine a comparative signal with the corresponding reference signal.

In some instances, an optical amplifier 42 is optionally positioned along the LIDAR signal waveguide 24 and is configured to provide amplification of the outgoing LIDAR signal and/or of the incoming LIDAR signal. Accordingly, the effects of optical loss at the signal-directing component 18 can be reduced.

Figure 1B:
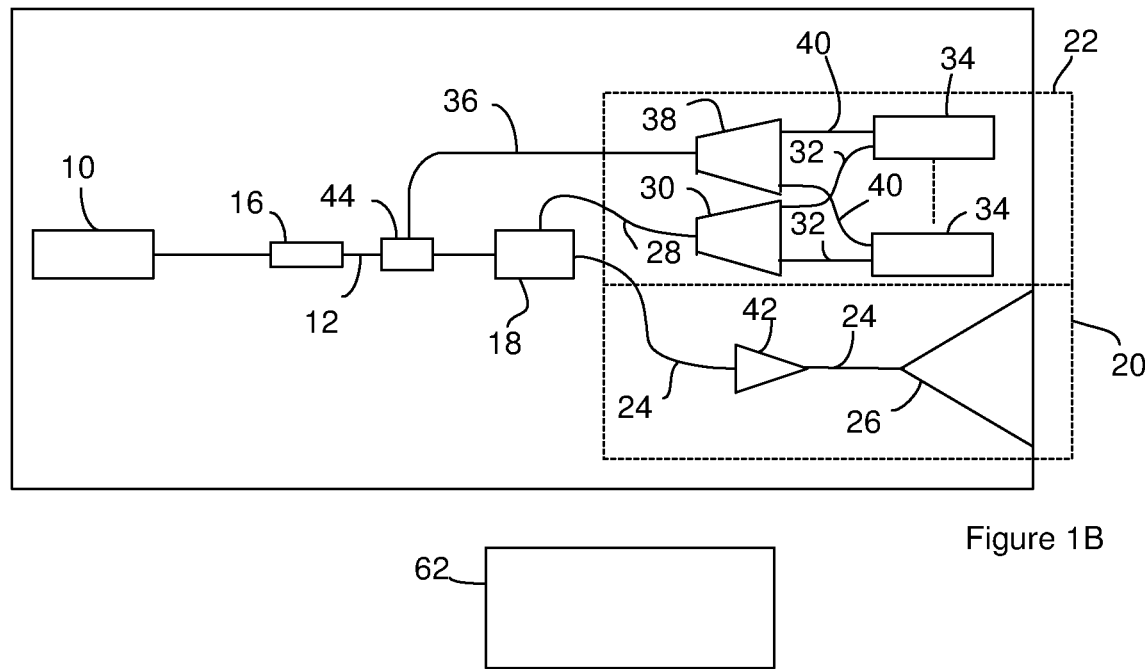
FIG. 1B is a schematic of another embodiment of a LIDAR system.

FIG. 1B illustrates the LIDAR system of FIG. 1A modified to include an optical circulator as the signal-directing component 18. The optical circulator is configured such that the outgoing LIDAR signal is directed to the LIDAR signal waveguide 24 and the incoming LIDAR signal is directed to the comparative signal waveguide 28. The comparative signal waveguide 28 carries the comparative incoming LIDAR signal to the comparative demultiplexer 30. Additionally, a tap component 44 is positioned along the utility waveguide 12. The tap component 44 is configured to tap off a first portion of the outgoing LIDAR signal such that the first portion of the outgoing LIDAR signal is received on the reference signal waveguide 36. The first portion of the outgoing LIDAR signal received by the reference signal waveguide 36 serves as the reference light signal. The reference signal waveguide 36 carries the reference light signal to the reference demultiplexer 38. Accordingly, the electronics can operate the LIDAR system of FIG. 1B as disclosed in the context of FIG. 1A. Suitable optical circulators include, but are not limited to, Faraday rotator based optical fiber circulators, and integrated optical circulators. Although the signal-directing component 18 of FIG. 1B is disclosed as an optical circulator, the signal-directing component 18 of FIG. 1B can be an optical coupler or optical switch.

Figure 2A:
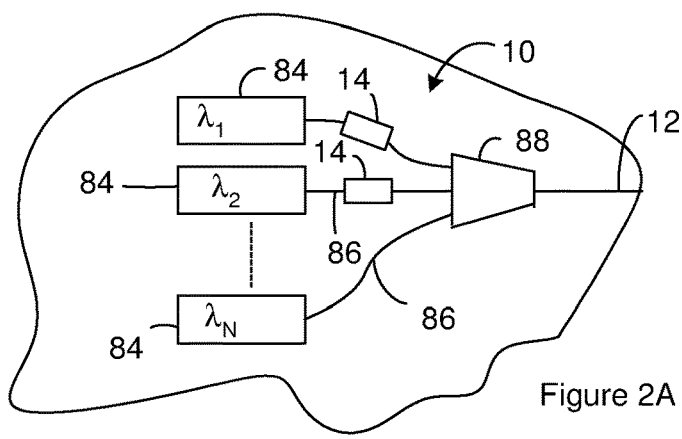
FIG. 2A illustrates a light source that includes multiple laser sources.

As noted above, one or more of the light sources 10 can be a comb laser. However, other constructions of the light source 10 are possible. For instance, FIG. 2A illustrates an example of a light source 10 that includes multiple laser sources 84. In some instances, each of the laser sources 84 outputs one or more of the channels on a source waveguide 86. The source waveguides 86 carry the channels to a laser multiplexer 88 that combines the channels so as to form a light signal that is received on a channel waveguide or the utility waveguide 12. Suitable laser multiplexers 88 include, but are not limited to, Arrayed Waveguide Grating (AWG) multiplexers, echelle grating multiplexers, and star couplers. The electronics can operate the laser sources 84 so the laser sources 84 concurrently output each of the channels. The electronics can operate the laser sources 84 so the laser sources 84 concurrently output each of the channels.

In some instances, each of the laser sources 84 outputs one of the channels on a source waveguide 86. The total number of laser sources 84 included in the light source 10 can be greater than or equal to the number of LIDAR output signals that are concurrently directed to a sample region. In some instances, the total number of laser sources 84 included in the light source 10 is equal to the number of LIDAR output signals that are concurrently directed to a sample region. As a result, each laser source 84 can be the source of a different one of the LIDAR output signals that are concurrently directed to a sample region.

The electronics can operate the laser sources 84 independently. For instance, the electronics can operate the laser sources 84 so as to provide the LIDAR output signals with a particular frequency versus time waveform. Since the electronics can operate the laser sources 84 independently and each laser sources 84 can be the source of a different one of the LIDAR output signals, the electronics can operate the laser sources 84 so different LIDAR output signals have different frequency versus time waveforms.

A modulator 14 can optionally be positioned along one or more of the source waveguides 86. The modulator 14 can each be configured to modulate the power of one of the channels and accordingly the amplitude of the resulting LIDAR output signal(s). The electronics can operate the modulator 14. Accordingly, the electronics can modulate the power of the LIDAR output signal(s). Suitable modulators 14 include, but are not limited to, PIN diode carrier injection devices, Mach-Zehnder modulator devices, and electro-absorption modulator devices. When the modulator 14 is constructed on a silicon-on-insulator platform, a suitable modulator is disclosed in U.S. patent application Ser. No. 617,810, filed on Sep. 21, 1993, entitled Integrated Silicon PIN Diode Electro-Optic Waveguide, and incorporated herein in its entirety.

The electronics can operate the modulators and/or the laser sources 84 so as to provide different LIDAR output signals with different waveforms. For instance, the electronics can operate one or more laser sources 84 to each produce a LIDAR output signal with a frequency that is not a function of time such as a continuous wave. Additionally or alternately, the electronics can operate one or more laser sources 84 and associated modulator(s) 14 so as to generate one or more LIDAR output signals that each has a chirped amplitude. Additionally or alternately, the electronics operate one or more laser sources 84 and associated modulator(s) 14 so as to generate a LIDAR output signal with a chirped amplitude and a chirped frequency (frequency that varies with time). In one example, the electronics can operate one or more laser sources 84 and associated modulator(s) 14 so as to generate at least one LIDAR output signal that has a chirped amplitude and at least one LIDAR output signal that with a frequency that is not a function of time such as a continuous wave. In another example, each of the source waveguides 86 excludes a modulator 14 and the electronics operate one or more laser sources 84 so as to generate two or more LIDAR output signal that each has an unchirped amplitude and a chirped frequency. In another example, each of the source waveguides 86 excludes a modulator 14 and the electronics operate one or more laser sources 84 so as to generate two or more LIDAR output signal that each has an unchirped amplitude and a chirped frequency and one or more LIDAR output signal that each has an unchirped amplitude and a unchirped frequency.

During operation of the LIDAR system, the generation of LIDAR data is divided into a series of cycles where LIDAR data is generated for each cycle. In some instances, each of the cycles corresponds to a different sample region in the field of view. Accordingly, different cycles can generate LIDAR data for different regions in a field of view. The cycles can be performed such that the duration of each cycle can be divided into different time periods. For instance, the duration of a cycle can include one or more data periods where the LIDAR input signals are generated and received at the LIDAR chip and one or more re-location periods where the LIDAR output signal is moved from one sample region to another sample region. In a continuous scan mode, the cycle does not include any re-location periods and the LIDAR output signal is moved continuously. In one example, the cycles include only one data period where multiple LIDAR output signals each carry a different channel are concurrently directed to the same sample region. In one example, a first one of the LIDAR output signals has a chirped amplitude and a second one of the LIDAR output signals has a frequency that is not a function of time such as a continuous wave.

Figure 2B:
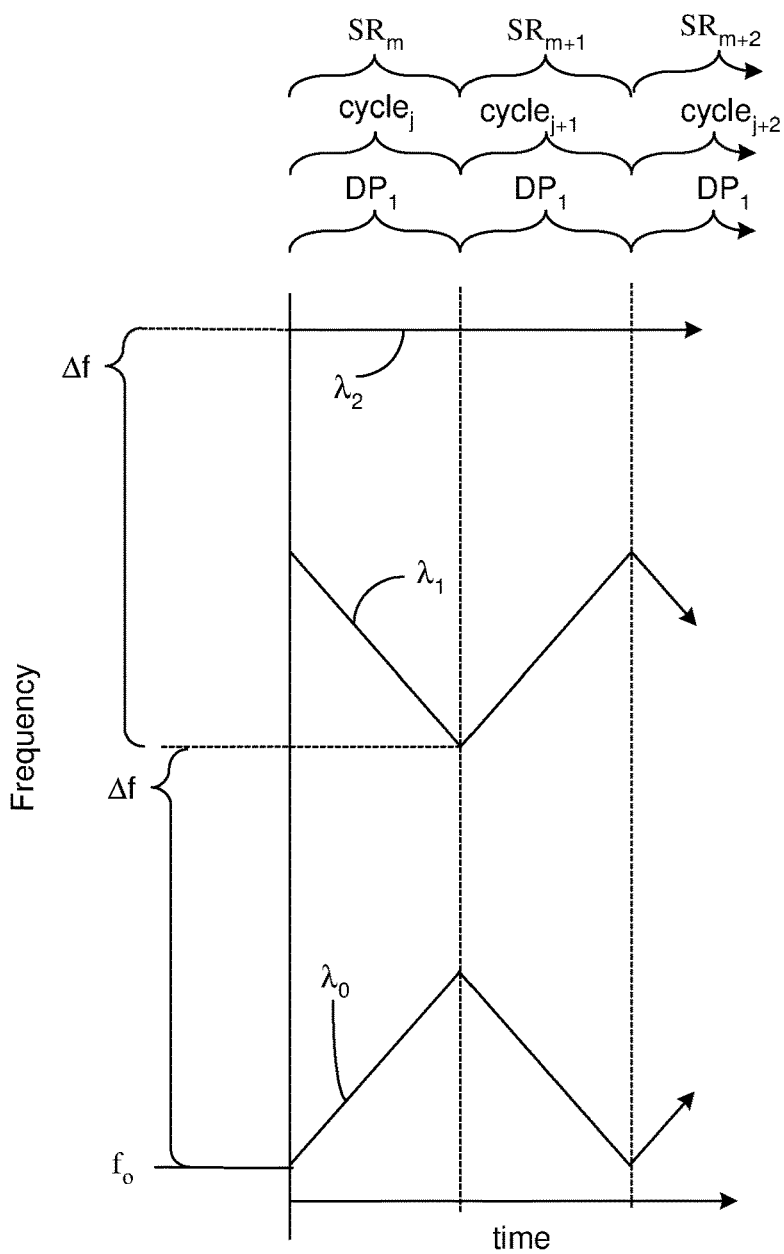
FIG. 2B illustrates the frequencies of LIDAR output signals that carry different channels as a function of time.

FIG. 2B presents an example of a scheme for tuning the LIDAR output signals. The frequency is shown for a sequence of several cycles that are each labeled $cycle_j$ through $cycle_{j+2}$. Each cycle includes K data periods that are each associated with a cycle index k and are labeled $DP_k$. In the example of FIG. 2B, each cycle includes a single data period labeled $DP_k$ with k=1. Each of the illustrated cycles corresponds to one of M different sample regions that are each associated with a cycle index m and are labeled $SR_m$ through $SR_{m+2}$. Accordingly, in the illustrated example, the LIDAR data generated in each cycle is for a different sample region although other configurations are possible. Since there are no re-location periods illustrated, the LIDAR system is being operated with a continuous scan or without a scan.

In the example of FIG. 2B, the LIDAR output signals each carries a channel labeled $\lambda_i$. In some instances, the base frequencies of the reference channels are separated by $\Delta f$. The frequencies are tuned such that there is no overlap in the frequencies of the different LIDAR output signals. The LIDAR output signals $\lambda_0$ and $\lambda_1$ each has a chirped frequency in that the frequency changes with time. During the same data period, the frequency change for $\lambda_0$ and $\lambda_1$ is in the opposite direction but at the same rate. As a result, a sample region is concurrently illuminated by at least one LIDAR output signal with an increasing frequency and at least one LIDAR output signal with a decreasing frequency where the rate of the frequency change is the same. The LIDAR output signal carrying the channel labeled $\lambda_2$ is optional. Although the LIDAR output signal labeled $\lambda_2$ is shown with an unchirped frequency, the LIDAR output signal labeled $\lambda_2$ can have a chirped or unchirped frequency.

When the LIDAR output signal $\lambda_2$ has a chirped frequency, the rate and/or direction of the frequency chirp can be different from the rate and direction of the frequency chirp of the LIDAR output signals $\lambda_0$ and also from the rate and direction of the frequency chirp of the LIDAR output signals $\lambda_1$.

In one example, the LIDAR output signals for each of the channels shown in FIG. 2B during a cycle can be represented by a sinusoid with a frequency represented by the following mathematical equations: for $\lambda_0$ the $f=f_0+0.5*\alpha*DP*[(-1)^j+1]+(-1)^{(j-1)}\{t-[(j-1)(DP)]\}\alpha$; for $\lambda_1$ the $f=f_0+\Delta f+0.5*\alpha'*DP*[(-1)^{(j-1)}+1]-(-1)^{(j-1)}\{t-[(j-1)](DP)\}\alpha'$; and for $\lambda_2$ the $f=f_0+2\Delta f+0.5*\alpha''*DP*[(-1)^j+1]+(-1)^{(j-1)}\{t-[(j-1)(DP)]\}\alpha''$ where $\alpha$, $\alpha'$, and $\alpha''$ each represents the rate of frequency change during the data period. The variable t represents time where $t=0$ at the start of each new cycle and/or at the start of each $DP_1$. In some instances, $\alpha=\alpha'$, $\alpha''\neq\alpha$, and $\alpha''\alpha'$. FIG. 2B illustrates an example where $\alpha=\alpha'$ and $\alpha''=0$.

One example of a LIDAR system includes a light source constructed according to FIG. 2A where the light source is configured to generate two LIDAR output signals. One of the LIDAR output signals carries a channel with a frequency versus time according to channel $\lambda_0$ of FIG. 2B and the other LIDAR output signal carries a channel with a frequency versus time according to channel $\lambda_1$ of FIG. 2B. Accordingly, the LIDAR system can be constructed according to FIG. 1A with two processing components 34. Another example of a LIDAR system includes a light source constructed according to FIG. 2A where the light source is configured to generate three LIDAR output signals. One of the LIDAR output signals carries a channel with a frequency versus time according to channel $\lambda_0$ of FIG. 2B, another LIDAR output signal carries a channel with a frequency versus time according to channel $\lambda_1$ of FIG. 2B, and another LIDAR output signal carries a channel with a frequency versus time according to channel $\lambda_2$ of FIG. 2B. Accordingly, the LIDAR system can be constructed according to FIG. 1A with three processing components 34. As is evident from these examples, the number of processing components 34 included in the LIDAR system can match the number of LIDAR output signals that each carries a different channel. Although FIG. 2B illustrates the frequency versus time waveform for three different channels, the LIDAR system can be configured to output more than three LIDAR output signals that each carries a different channel.

Suitable laser sources 84 for use with a light source 10 constructed according to FIG. 2A include, but are not limited to, external cavity lasers, distributed feedback lasers (DFBs), and Fabry-Perot (FP) lasers. External cavities lasers are advantageous in this embodiment because of their generally narrower linewidths, which can reduce noise in the detected signal.

Figure 3A:
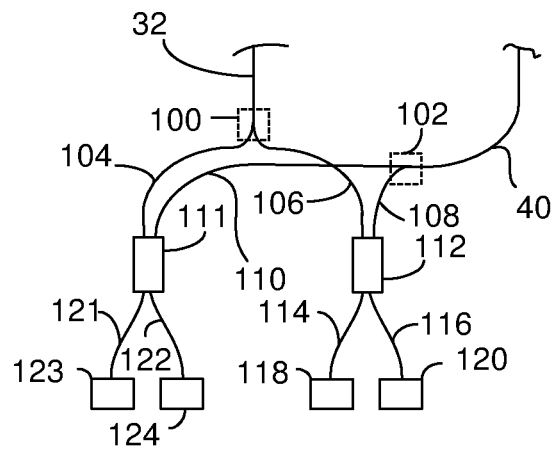
FIG. 3A illustrates an example of a processing unit suitable for use with the LIDAR system of FIG. 1A and/or FIG. 1B.
Figure 3B:
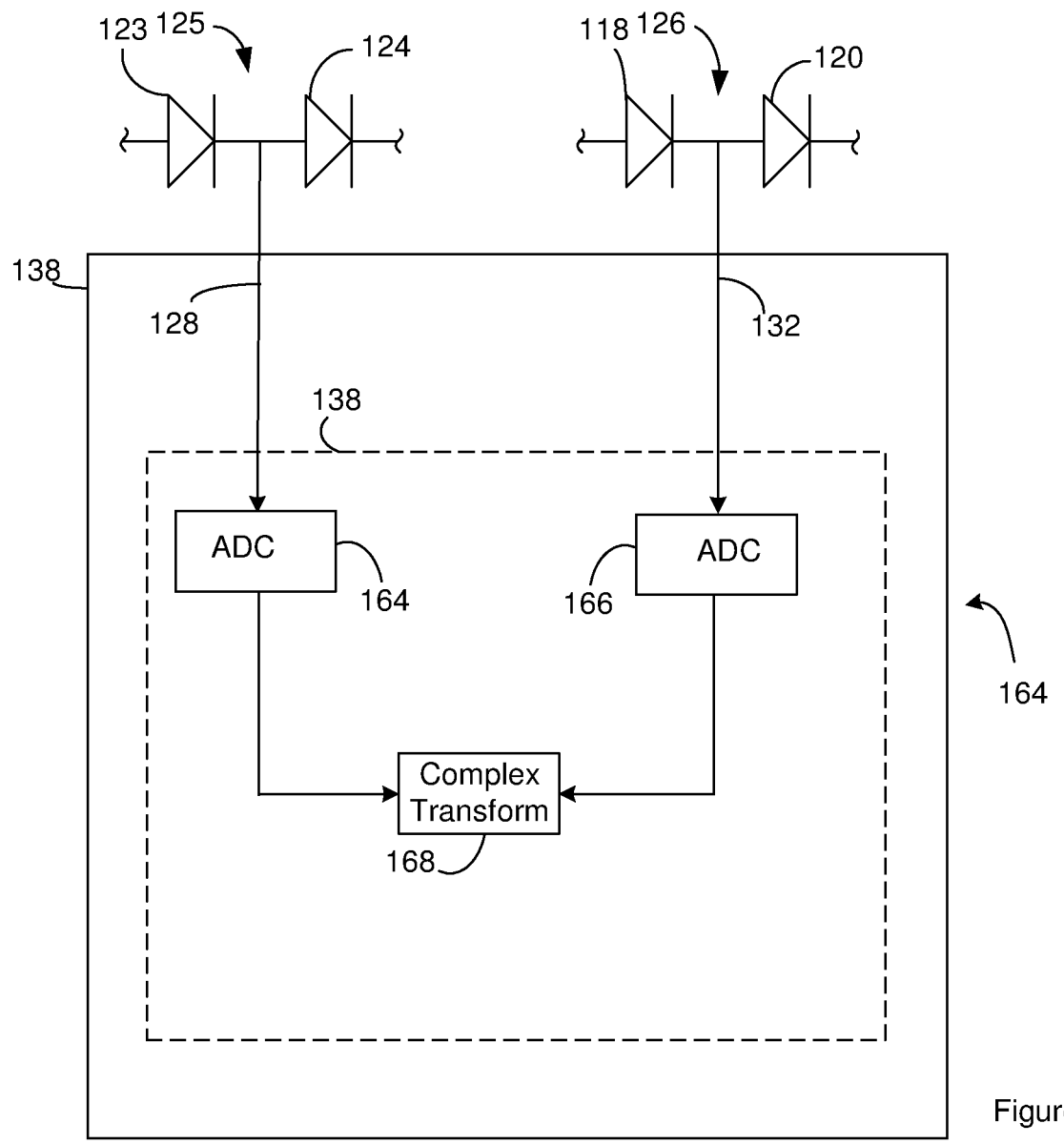
FIG. 3B provides a schematic of electronics that are suitable for use with a processing unit constructed according to FIG. 3A.

FIG. 3A through FIG. 3B illustrate an example of suitable processing components 34 for use in the LIDAR system of FIG. 1A and FIG. 1B. The processing unit includes a first splitter 102 that divides a reference signal carried on a reference waveguide 40 onto a first reference waveguide 110 and a second reference waveguide 108. The first reference waveguide 110 carries a first portion of the reference signal to a light-combining component 111. The second reference waveguide 108 carries a second portion of the reference signal to a second light-combining component 112.

The processing unit includes a second splitter 100 that divides the comparative signal carried on the comparative waveguide 32 onto a first comparative waveguide 104 and a second comparative waveguide 106. The first comparative waveguide 104 carries a first portion of the comparative signal to the light-combining component 111. The second comparative waveguide 108 carries a second portion of the comparative signal to the second light-combining component 112.

The second light-combining component 112 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The light-combining component 112 also splits the resulting second composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first light-combining component 111 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The light-combining component 111 also splits the first composite signal onto a first detector waveguide 121 and a second detector waveguide 122.

The first detector waveguide 121 carries a first portion of the first composite signal to a first light sensor 123 that converts the first portion of the second composite signal to a first electrical signal. The second detector waveguide 122 carries a second portion of the second composite signal to a second auxiliary light sensor 124 that converts the second portion of the second composite signal to a second electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 110 and the second reference waveguide 108 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 123 and the second light sensor 124 can be connected as a balanced detector and the first auxiliary light sensor 118 and the second auxiliary light sensor 120 can also be connected as a balanced detector. For instance, FIG. 3B provides a schematic of the relationship between the electronics, the first light sensor 123, the second light sensor 124, the first auxiliary light sensor 118, and the second auxiliary light sensor 120. The symbol for a photodiode is used to represent the first light sensor 123, the second light sensor 124, the first auxiliary light sensor 118, and the second auxiliary light sensor 120 but one or more of these sensors can have other constructions. In some instances, all of the components illustrated in the schematic of FIG. 3B are included on the LIDAR chip. In some instances, the components illustrated in the schematic of FIG. 3B are distributed between the LIDAR chip and electronics located off of the LIDAR chip.

The electronics connect the first light sensor 123 and the second light sensor 124 as a first balanced detector 125 and the first auxiliary light sensor 118 and the second auxiliary light sensor 120 as a second balanced detector 126. In particular, the first light sensor 123 and the second light sensor 124 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a transform mechanism 138 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 138 includes a first Analog-to-Digital Converter (ADC) 164 that receives the first data signal from the first data line 128. The first Analog-to-Digital Converter (ADC) 164 converts the first data signal from an analog form to a digital form and outputs a first digital data signal. The transform mechanism 138 includes a second Analog-to-Digital Converter (ADC) 166 that receives the second data signal from the second data line 132. The second Analog-to-Digital Converter (ADC) 166 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 138 includes a transform component 168 that receives the complex data signal. For instance, the transform component 168 receives the first digital data signal from the first Analog-to-Digital Converter (ADC) 164 as an input and also receives the second digital data signal from the first Analog-to-Digital Converter (ADC) 166 as an input. The transform component 168 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the beat frequency of the composite signal. The transform component 168 can execute the attributed functions using firmware, hardware or software or a combination thereof.

Figure 3C:
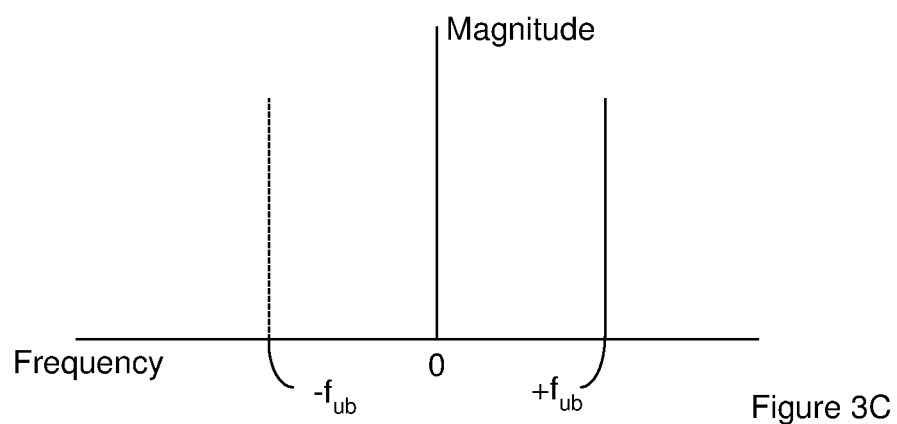
FIG. 3C is a graph of magnitude versus frequency. A solid line on the graph shows results for a Complex Fourier transform.

The solid line in FIG. 3C provides an example of the output of the transform mechanism when a Complex Fourier transform converts the input from the time domain to the frequency domain. The solid line shows a single frequency peak. A peak can be considered to occur when the amplitude of output rises significantly above the background noise. In some instances, a peak threshold is used where the frequency values with an amplitude below the peak threshold are considered noise and frequency values that peak at an amplitude above the peak threshold are considered to be frequency peaks. The frequency associated with this peak is used by the electronics as the beat frequency of the composite signal. When the LIDAR output signal has a frequency that does not change with time as shown by $\lambda_2$ of FIG. 2B, the shift in frequency of LIDAR input signal relative to the LIDAR output signal is caused by the radial velocity between the reflecting object and the LIDAR chip and not by the distance between the reflecting object and the LIDAR chip. The electronics use the beat frequency output from the transform component 168 for further processing to generate the LIDAR data (distance and/or radial velocity between the reflecting object and the LIDAR chip or LIDAR system).

FIG. 3C also includes a second peak illustrated by a dashed line. Prior methods of resolving the beat frequency of composite signals made use of real Fourier transforms rather than the Complex Fourier transform technique disclosed above. These prior methods output both the peak shown by the dashed line and the solid line. Accordingly, the prior methods output multiple different frequencies that are both associated with a single object in the sample region in that each of the associated frequencies would not be present if the object were removed from the sample region. As noted above, when using LIDAR applications, it can become difficult to identify the correct peak. Since the above technique for resolving the frequency generates a single solution for the frequency, the inventors have resolved the ambiguity with the frequency solution.

The electronics use the single frequency represented by the solid line in FIG. 3C to generate LIDAR data. For instance, the following equation applies during a data period where the frequency of the LIDAR output signal increases during the data period such as occurs with the LIDAR output signal $\lambda_0$ of FIG. 2B during cycle j: $+f_{ub}=-f_d+\alpha\tau_0$ where $f_{ub}$ is the beat frequency provided by the transform component, $f_d$ represents the Doppler shift ($f_d=2vf_0/c$ where $f_c$ is the frequency of the LIDAR output signal at the start of the data period (i.e. t=0), v is the radial velocity between the reflecting object and the LIDAR chip where the direction from the reflecting object toward the chip is assumed to be the positive direction, and c is the speed of light, $\alpha$ represents the rate at which the frequency of the outgoing LIDAR signal is increased or decreased during the period, and $\tau_0$ is the roundtrip delay (time between the LIDAR output signal exiting from the LIDAR chip and the associated LIDAR input signal returning to the LIDAR chip) for a stationary reflecting object. The following equation applies during a data period where electronics decrease the frequency of the LIDAR output signal during the data period such as occurs with the LIDAR output signal $\lambda_1$ of FIG. 2B during cycle j: $-f_{ub}=-f_d-\alpha\tau_0$ where fat, is the beat frequency provided by the transform mechanism. In these two equations, $f_d$ and $\tau_0$ are unknowns. These two equations are solved for the two unknowns $f_d$ and $\tau_0$. The values of $f_{db}$ and $f_{ub}$ that are substituted into the solution come from different processing units (labeled 34 in FIG. 1A and FIG. 1B) because the value of fa is generated from a LIDAR output signal carrying a different channel than the LIDAR output signal from which the value of $f_{ub}$ is generated. The different LIDAR output signals are concurrently incident on the same sample region $SR_m$, during the same data period $DP_k$ of the same cycle (cycle$_j$). As a result, multiple different LIDAR input signals are used to generate the values of $f_d$ and $\tau_0$ for a single sample region. The radial velocity for that sample region can then be determined from the Doppler shift ($v=c*f_d/(2f_c)$) and the separation distance for that sample region can be determined from $c*\tau_0/2$. As a result, the LIDAR data for a single sample region can be determined using multiple LIDAR output signals that illuminate the sample region.

As discussed above, the LIDAR system can output more than two LIDAR output signals that each carries a different channel. For instance, the LIDAR system can output three LIDAR output signals that have frequency versus time waveforms according to FIG. 2B. This may be desirable in situations where more than one reflecting object may be located in a sample region. Different reflecting objects in a sample region need not be physically separate items but can be different surfaces of the same item that are located different distances from the LIDAR system and/or are moving at different radial velocities relative to the LIDAR system as might occur with a jagged object that is both rotating and translating relative to the LIDAR system.

In situations where more than one reflecting object may be located in a sample region, the transform components 168 can output more than one frequency value where each of the different frequency values is associated with a different one of the reflecting objects. In these instances, it may be necessary to match the frequencies provided by the transform components 168 in different processing units. The matching is performed such that the matched frequencies are frequencies from the same reflecting object. The use of additional LIDAR signals can be used to match frequencies. LIDAR data can be generated for each pair of matched frequencies and is considered and/or processed as the LIDAR data for the different reflecting objects in the sample region.

One example of a LIDAR system includes a light source configured to generate three LIDAR output signals. One of the LIDAR output signals carries a channel with a frequency versus time according to channel $\lambda_0$ of FIG. 2B, another LIDAR output signal carries a channel with a frequency versus time according to channel $\lambda_1$ of FIG. 2B, and another LIDAR output signal carries a channel with a frequency versus time according to channel $\lambda_2$ of FIG. 2B. In this instance, the frequency output from the transform components 168 associated with the processing unit that receives the channel $\lambda_2$ is: $f_2=-f_d+\alpha''\tau_0$ where $f_d$ represents the Doppler shift, $\alpha''$ represents the rate at which the frequency of the LIDAR output signal $\lambda_2$ is increased or decreased during the data period, and $\tau_0$ is the roundtrip delay (time between the LIDAR output signal $\lambda_2$ exiting from the LIDAR chip and the associated LIDAR input signal returning to the LIDAR chip). When the frequency versus time for $\lambda_2$ is according to FIG. 2B results, $\alpha''=0$ and this equation reduces to $f_2=-f_d$. The equation for $f_2$ can be used to generate a theoretical $f_2$ for at least a portion of the possible frequency pairs and the theoretical $f_2$ values can be compared to the actual $f_2$ values provided by the transform components 168 associated with the processing unit that receives the channel $\lambda_2$. The frequency pair that provides a theoretical $f_2$ value closest to the actual $f_2$ value is considered a matching pair. LIDAR data can be generated for each of the matching pairs and the LIDAR data from the matching pairs can be considered and/or processed as the LIDAR data for each of the different reflecting objects in the sample region.

As one example of the identification of matching pairs, the transform components 168 associated with the processing unit that receives the channel $\lambda_0$ outputs two different frequencies for $f_{db}$: $f_{d01}$ and $f_{d02}$. Additionally, the transform components 168 associated with the processing unit that receives the channel $\lambda_1$ outputs two different frequencies for $f_{db}$: $f_{d11}$ and $f_{d12}$. In this instance, the possible frequency pairings are: ($f_{d01}$, $f_{d11}$); ($f_{d01}$, $f_{d12}$); ($f_{d02}$, $f_{d11}$); and ($f_{d02}$, $f_{d12}$). A value of $f_d$ and $\tau_0$ can be calculated for each of the four possible frequency pairings as described above. Each pair of values for $f_d$ and $\tau_0$ can be substituted into $f_2=-f_d+\alpha''\tau_0$ to generate a theoretical $f_2$ for each of the possible frequency pairings. As noted above, when $\alpha''=0$, the equation reduces to $f_2=-f_d$. In these instances, there is no need to calculate 4 for the possible frequency pairings. The transform components 168 associated with the processing unit that receives the channel $\lambda_2$ also outputs two values for $f_2$ that are each treated as an actual $f_2$ value. The frequency pair with a theoretical $f_2$ value closest to each of the actual $f_2$ values is considered a matching pair. LIDAR data can be generated for each of the matching pairs as described above and is considered and/or processed as the LIDAR data for a different one of the reflecting objects in the sample region.

Above, the complex data signals are described as having an in-phase component and a quadrature component that include out-of-phase portions of the reference signal; however, the unambiguous LIDAR data solution can be achieved by generating other complex data signals. For instance, the unambiguous LIDAR data solution can be achieved using a complex data signal where the in-phase component and the quadrature component include out-of-phase portions of the comparative signal. For instance, the first comparative waveguide 104 and the second comparative waveguide 106 can be constructed so as to provide a 90 degree phase shift between the first portion of the comparative signal and the second portion of the comparative signal with the first reference waveguide 110 and the second reference waveguide are constructed such that the first portion of the reference signal and the second portion of the reference signal are in-phase in the composite signals. Accordingly, the portion of the comparative signal in the first composite signal is phase shifted relative to the portion of the comparative signal in the second composite signal, however, the portion of the reference signal in the first composite signal is not phase shifted relative to the portion of the reference signal in the second composite signal.

Figure 4:
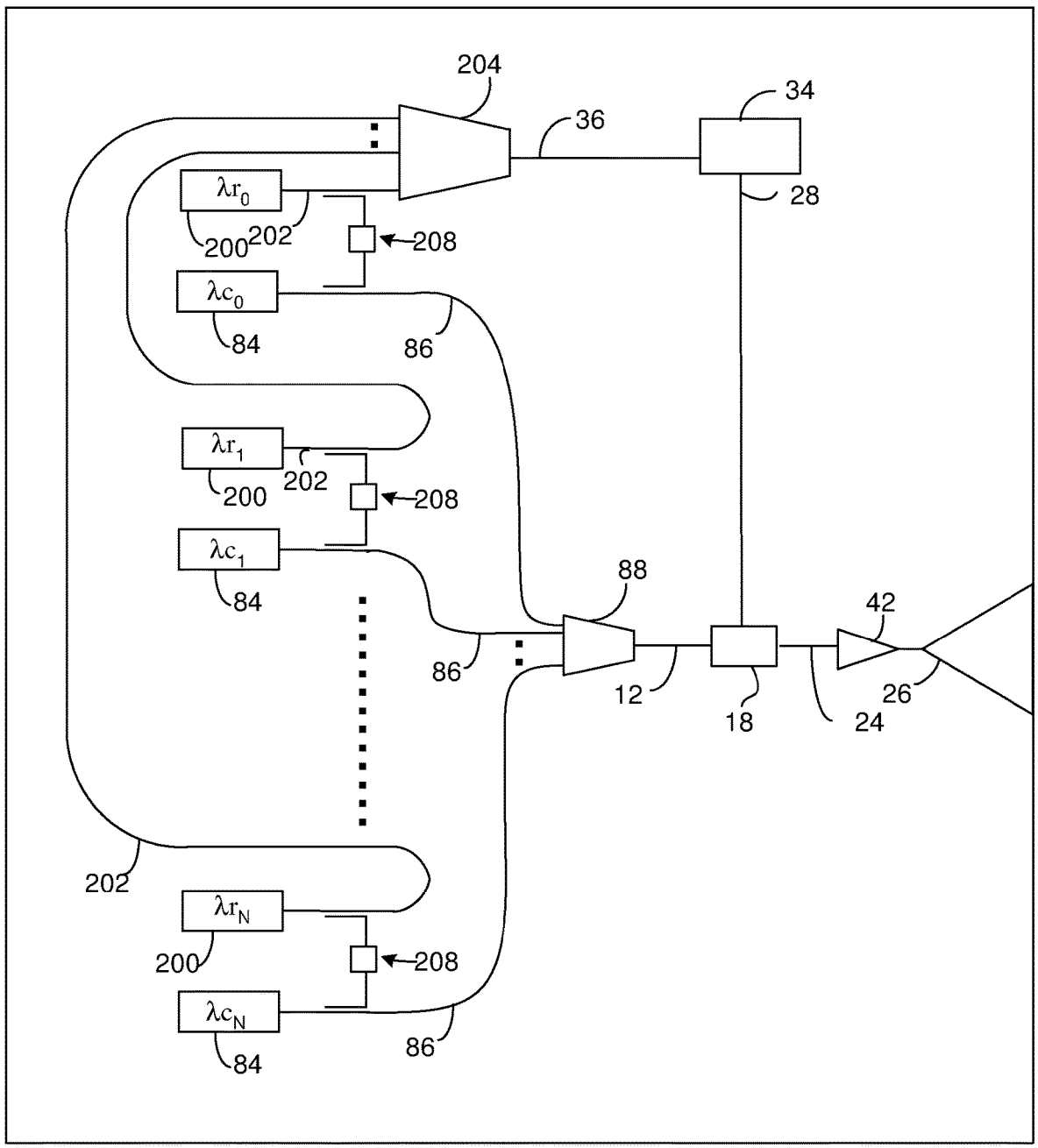
FIG. 4 is a schematic of another embodiment of a LIDAR system.

FIG. 4 is a schematic of a LIDAR system that includes multiple comparative laser sources 84. Each of the laser sources 84 can output one or more of the channels on a source waveguide 86. The source waveguides 86 carry the channels to a laser multiplexer 88 that combines the channels so as to form the outgoing LIDAR signal that is received on the utility waveguide 12. The electronics can operate the laser sources 84 so the laser sources 84 concurrently output each of the channels.

In some instances, each of the laser sources 84 outputs one of the channels on a source waveguide 86. The total number of laser sources 84 included in the light source 10 can be greater than or equal to the number of LIDAR output signals that are concurrently directed to a sample region. In some instances, the total number of laser sources 84 included in the light source 10 is equal to the number of LIDAR output signals that are concurrently directed to a sample region. As a result, each laser source 84 can be the source of a different one of the LIDAR output signals that are concurrently directed to a sample region.

The electronics can operate the laser sources 84 independently. For instance, the electronics can operate the laser sources 84 so as to provide the LIDAR output signals with a particular frequency versus time waveform. Since the electronics can operate the laser sources 84 independently and each laser sources 84 can be the source of a different one of the LIDAR output signals, the electronics can operate the laser sources 84 so different LIDAR output signals have different frequency versus time waveforms.

The utility waveguide 12 carries the outgoing LIDAR signal from the laser multiplexer 88 to the signal-directing component 18. The signal-directing component 18 can direct the outgoing LIDAR signal to a LIDAR signal waveguide 24 and/or a comparative signal waveguide 28.

The LIDAR signal waveguide 24 carries at least a portion of the outgoing LIDAR signal to the output component 26 through which the outgoing LIDAR signal exits from the LIDAR chip. When the outgoing LIDAR signal includes multiple different channels at different wavelengths, the output component 26 can be configured such that each of the different channels is incident on the same sample region in the field of view. For instance, the output component 26 can be configured such that each of the different channels travels away from the LIDAR chip in the same direction or in substantially the same direction.

After exiting from the output component 26, the different channels each serve as a LIDAR output signal where the LIDAR output signals are each at a different wavelength (channel). The LIDAR output signals can be reflected by a reflecting object (not shown) located outside of the LIDAR system. Each of the reflected LIDAR output signals returns to the output component 26 as a LIDAR input signal. The output component 26 receives the LIDAR input signals and outputs the result on the LIDAR signal waveguide 24 as an incoming LIDAR signal.

The LIDAR signal waveguide 24 carries the incoming LIDAR signal to the signal-directing component 18. The signal-directing component 18 directs the incoming LIDAR signal to the utility waveguide 12 and/or the comparative signal waveguide 28. The portion of the incoming light signal-directed to the comparative signal waveguide 28 serves as the comparative light signal. The comparative signal waveguide 28 carries the comparative light signal to a processing component 34.

The system includes reference laser sources 200 that each outputs a reference channel. The reference channels are each at a different wavelength. The wavelengths of the reference channels can be periodically spaced in that the wavelength increase from one reference channel to the next reference channel is constant or substantially constant. Suitable reference laser sources 200 and laser sources 84 include, but are not limited to, external cavity lasers, distributed feedback lasers (DFBs), and Fabry-Perot (FP) lasers. External cavities lasers may be advantageous in this embodiment because of their generally narrower linewidths, which can reduce noise in the detected signal.

The reference channels can each be associated with one of the comparative channels. The comparative channel and the associated reference channel can be an associated channel pair that are each associated with the same channel index i. For instance, the comparative channels can be expressed as $\lambda c_i$ and the reference channels can be expressed as $\lambda r_i$ where the comparative channel ($\lambda c_i$) and the associated reference channel ($\lambda r_i$) each has the same value for the index i. The frequency of each comparative channel can be equal to the frequency of the associated reference channel plus a separation factor that can be positive or negative. As a result, the reference channel and the associated comparative channel have the same base frequency. The separation factor is selected to be different for each pair of associated channels. For instance, the frequency of comparative channel with channel index i ($fc_i$) can be $fc_i = fr_i + (i)df$ or $fc_i = fr_i + (i+1)df$ where i is an integer greater than or equal to 0, $fr_i$ represents the frequency of reference channel i, df represents the change in the separation factor for adjacent comparative channels and $((i)df$ or $(i+1)df)$ represents the separation factor for comparative channel i. In some instances, the total number of comparative channels (N+1) is equal to the number of LIDAR output signals concurrently directed to a sample region. The frequencies of the reference channels can also be different. In some instances, the frequencies of the reference channels increase linearly. For instance, the frequency of reference channel i ($fr_i$) can be $fr_i = f_o + (i)\Delta f$ where $f_o$ represents the frequency of reference channel i=0, $\Delta f$ represents the increase in the separation factor for adjacent reference channels and ($f_o + (i)\Delta f$) represents the base frequency for comparative channel i and reference channel i.

The LIDAR input signals each include LIDAR data in that at least one characteristic of the LIDAR input signal is a function of the distance and/or radial velocity between the source of a LIDAR output signal and a reflecting object. In contrast, the associated reference channels in the reference signal are not a function of the distance and/or radial velocity between the source of a LIDAR output signal and a reflecting object. Accordingly, the associated reference channels can exclude the LIDAR data. However, each reference channel includes reference data. For instance, one or more characteristics of each reference channel indicates the value that the corresponding characteristic in the associated LIDAR input signal (the LIDAR input signal having the comparative channel associated with the reference channel) would have if the associated LIDAR input signal had not left the source of the LIDAR output signal and been reflected by a reflecting object. As a result, one or more characteristics of each reference channel provide a reference against which the corresponding characteristic of the associated LIDAR input signal can be measured. For instance, the frequency of each reference channel can be compared against the frequency of the associated LIDAR input signal. Since the frequency of the reference channel represents the frequency that the associated LIDAR input signal would have if it had not exited from the LIDAR chip and been reflected by a reflecting object. As a result, the difference between the frequency of a reference channel and the frequency of the associated LIDAR input signal is a function of the distance and/or radial velocity between the source of the associated LIDAR output signal and a reflecting object. As will be described in more detail below, one method of comparing the frequency of each reference channel against the frequency of the associated LIDAR input signal is to beat the reference channel and the associated comparative channel after reflection of the associated comparative channel.

The LIDAR system also includes reference channel waveguides 202 that each receives one of the reference channels from a different reference light source 200. The reference signal waveguides 202 each carries the received reference channel to a reference combiner 204 that combines the reference channels into the reference light signal. The reference light signal is received on the reference signal waveguide 36. The reference signal waveguide 36 carries the reference light signal to the processing component 34. Suitable reference combiners 204 include, but are not limited to, Arrayed Waveguide Grating (AWG) multiplexers, echelle grating multiplexers, and star couplers.

The LIDAR system also includes wavelength lockers 208 that keep the frequencies of the reference channels locked to the frequencies of the associated comparative channels. The wavelength locker 208 can be configured such that a difference in the frequency between a reference channel and the associated comparative channel is maintained when the frequency of a comparative channel is tuned or changes in response to other factors. Suitable wavelength locking techniques include, but are not limited to generation of error signals by splitting the laser signal into a reference and filter path and using the error signal to adjust the laser current to maintain the target wavelength. Suitable filters include but are not limited to, thin film filters, diffraction gratings, and Fabry-Perot etalons.

The signal-directing component 18 can be an optical circulator. The optical circulator is configured such that the outgoing light signal is directed to the LIDAR signal waveguide 24 and the incoming light signal is directed to the comparative signal waveguide 28. Although the signal-directing component 18 of FIG. 4 is disclosed as an optical circulator, the signal-directing component 18 of FIG. 4 can be an optical coupler or optical switch.

During operation of the LIDAR system of FIG. 4, the generation of LIDAR data is divided into a series of cycles where LIDAR data is generated for each cycle. In some instances, each of the cycles corresponds to a different sample region in the field of view. Accordingly, different cycles can generate LIDAR data for different sample regions in a field of view. The cycles can be performed such that the duration of each cycle can be divided into different time periods. For instance, the duration of a cycle can include one or more data periods where the LIDAR input signals are generated and received at the LIDAR chip and one or more re-location periods where the LIDAR output signal is moved from one sample region to another sample region. In a continuous scan mode, the cycle does not include any re-location periods and the LIDAR output signals is moved continuously. In one example, the cycles include only one data period where multiple LIDAR output signals each carry a different channel are concurrently directed to the same sample region.

During a data period, the different LIDAR output signals can have different frequency versus time functions. For instance, the electronics can tune the frequency of one or more of the LIDAR output signals during the data period and/or can maintain the frequency of the one or more of the LIDAR output signals at a constant level. For instance, during the data period in a first cycle, the electronics can increase the frequency of the outgoing LIDAR signal and during the data period in a second cycle the electronics can decrease the frequency of the same LIDAR output signal. The frequency of the LIDAR output signal can be tuned such that the frequencies for each comparative channel in the outgoing LIDAR signal is tuned away from the base frequency plus the separation factor. Suitable methods for tuning the frequencies of the LIDAR output signals include, but are not limited to, changing the level of electrical current through one or more laser sources 84. Due to the presence of the wavelength lockers, tuning the frequencies of a comparative channel also results in a corresponding level of tuning to the frequency of the associated reference channel.

Figure 5:
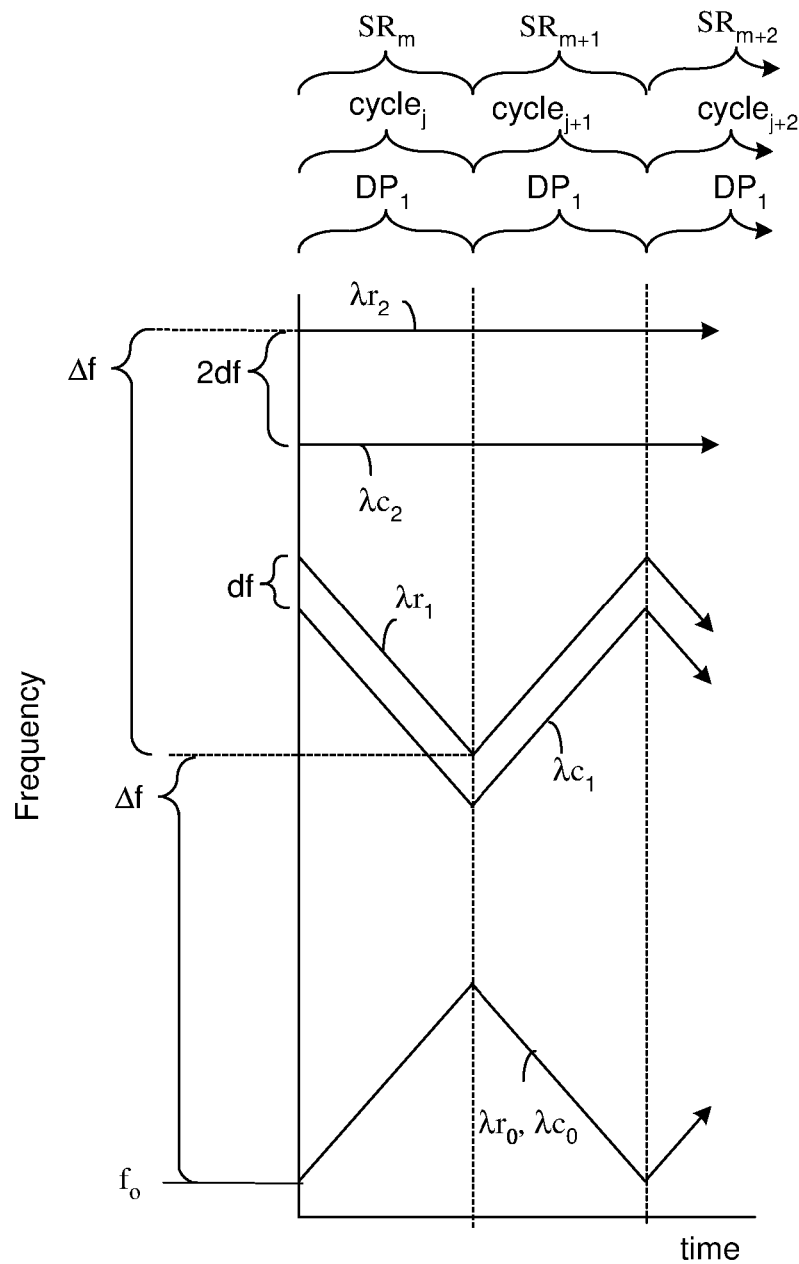
FIG. 5 illustrates a frequency versus time scheme for use with LIDAR output signals for a LIDAR system according to FIG. 4.

FIG. 5 presents an example of a suitable scheme for tuning the LIDAR output signals. The frequency is shown for a sequence of several cycles that are each labeled $cycle_j$ through $cycle_{j+2}$. Each cycle includes K data periods that are each associated with a cycle index k and are labeled $DP_k$. In the example of FIG. 2B, each cycle includes a single data period labeled $DP_k$ with k=1. Each of the illustrated cycles corresponds to one of M different sample regions that are each associated with a cycle index m and are labeled $SR_m$ through $SR_{m+2}$. Accordingly, in the illustrated example, the LIDAR data generated in each cycle is for a different sample region although other configurations are possible. Since there are no re-location periods illustrated, the LIDAR system is being operated with a continuous scan or without a scan.

In FIG. 5, the comparative channels are labeled $\lambda c_i$ and the reference channels are labeled $\lambda r_i$. The separation factor of (i)df is maintained during the tuning. The base frequencies of the reference channels are separated by $\Delta f$. The frequencies are tuned such that there is no overlap in the frequencies of different channels but there can be overlap in the frequencies of associated channels. The comparative channels $\lambda c_0$ and $\lambda c_1$ each has a frequency that changes with time. During the same data period, the frequency change is in the opposite direction but at the same rate. As a result, a sample region is concurrently illuminated by one LIDAR output signal with an increasing frequency and another LIDAR output signal with a decreasing frequency where the rate of the frequency change is the same.

In one example, the LIDAR output signals for each of the channels in FIG. 5 during each cycle can be represented by a sinusoid with a frequency represented by the following mathematical equations: for $\lambda_{c0}$ the $f=f_0+0.5*\alpha*DP*[(-1)^j+1]+(-1)^{(j-1)}\{t-[(j-1)(DP)]\}\alpha+C$; for $\lambda_{c1}$ the $f=f_0+\Delta f+0.5*\alpha'*DP*[(-1)^{(j+1)}+1]-(-1)^{(j-1)}\{t-[(j-1)](DP)\}\alpha'$; and for $\lambda_{c2}$ the $f=f_0+2\Delta f+0.5*\alpha''*DP*[(-1)^j+1]+(-1)^{(j-1)}$ $\{t-[(j-1)(DP)]\}\alpha''+C$ where C=0 for comparative channels; $\alpha$, $\alpha'$, and $\alpha''$ each represents the rate of frequency change during the data period. The variable t represents time where t=0 at the start of each new cycle and/or at the start of each $DP_1$. In some instances, $\alpha=\alpha'$, $\alpha''\neq\alpha$, and $\alpha''\neq\alpha'$. FIG. 5 illustrates an example where $\alpha=\alpha'$ and $\alpha$ $f=f_0+2\Delta f+0.5*\alpha*DP*[(-1)^j+1]+(-1)^{(j-1)}\{t-[(j-1)(DP)]\}\alpha''=0$. The corresponding reference signals can also be represented by the same equation and variables but with C=(i)df.

Figure 6A:
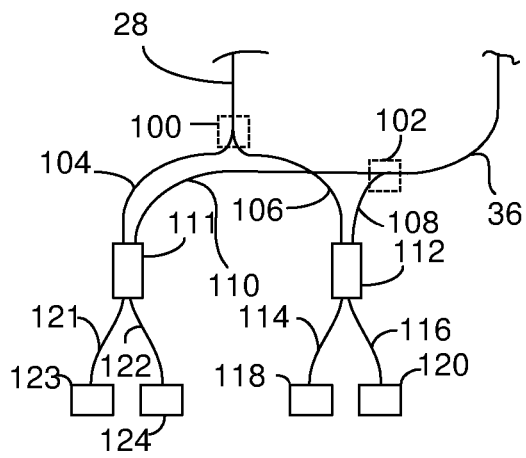
FIG. 6A through FIG. 6C illustrate an example of suitable processing component for use with a LIDAR system according to FIG. 4.
Figure 6B:
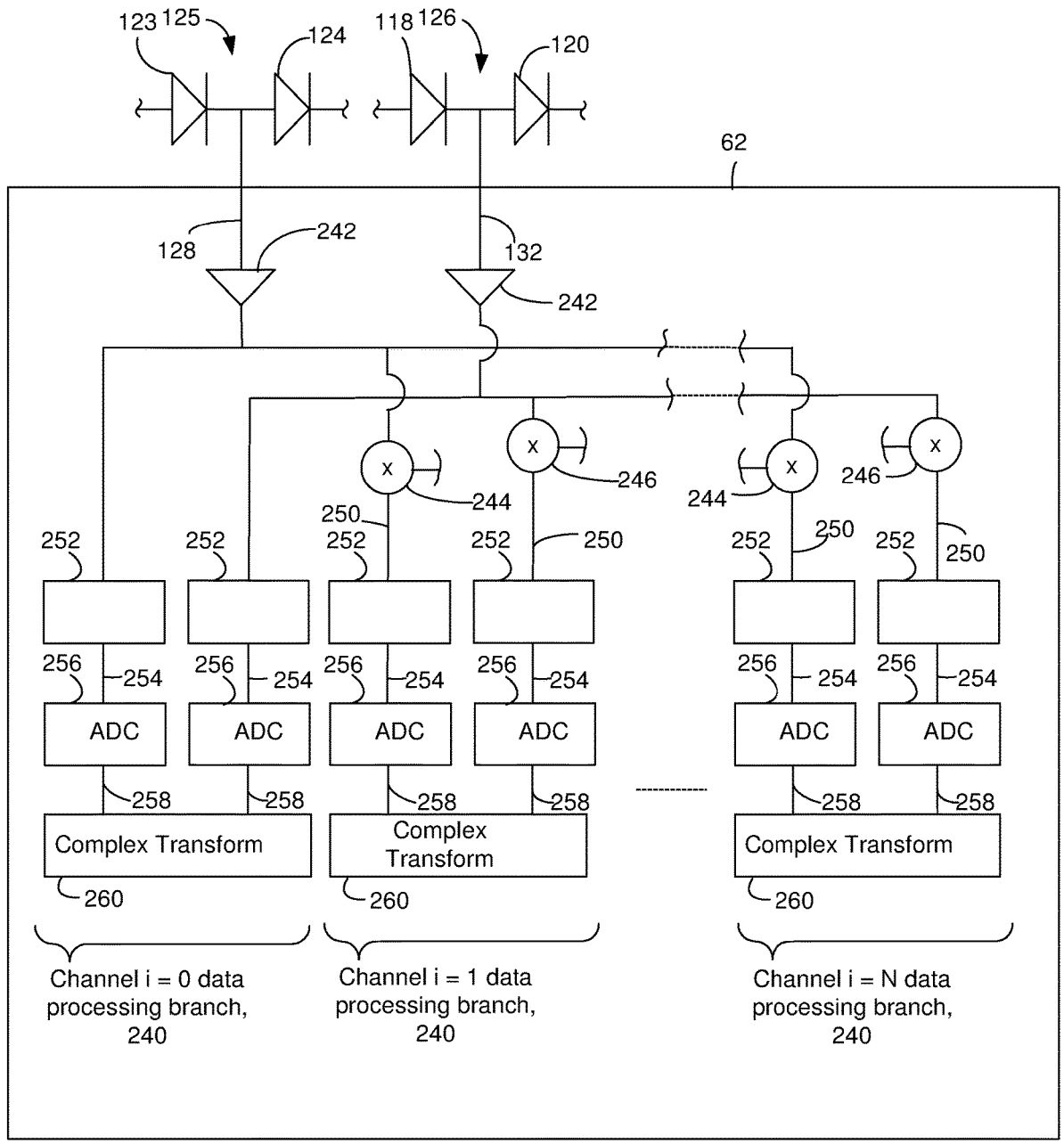
Figure 6C:
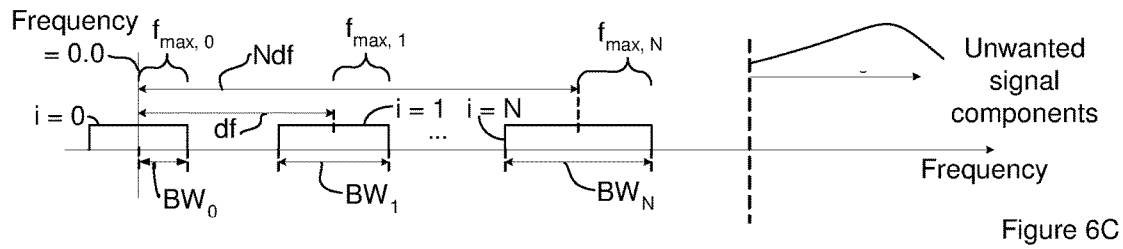

FIG. 6A through FIG. 6C illustrate an example of suitable processing components 34 for use in a LIDAR system constructed according to FIG. 4. A first splitter 102 divides the reference light signal carried on the reference signal waveguide 36 onto a first reference waveguide 110 and a second reference waveguide 108. The first reference waveguide 110 carries a first portion of the reference signal to a light-combining component 111. The second reference waveguide 108 carries a second portion of the reference signal to a second light-combining component 112.

A second splitter 100 divides the comparative signal carried on the comparative waveguide 28 onto a first comparative waveguide 104 and a second comparative waveguide 106. The first comparative waveguide 104 carries a first portion of the comparative signal to the light-combining component 111. The second comparative waveguide 108 carries a second portion of the comparative signal to the second light-combining component 112.

The second light-combining component 112 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The light-combining component 112 also splits the resulting second composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first light-combining component 111 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The light-combining component 111 also splits the first composite signal onto a first detector waveguide 121 and a second detector waveguide 122.

The first detector waveguide 121 carries a first portion of the first composite signal to a first light sensor 123 that converts the first portion of the first composite signal to a first electrical signal. The second detector waveguide 122 carries a second portion of the second composite signal to a second auxiliary light sensor 124 that converts the second portion of the second composite signal to a second electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sine function and the other reference signal portion can be a cosine function. In one example, the first reference waveguide 110 and the second reference waveguide 108 are constructed such that the first reference signal portion is a cosine function and the second reference signal portion is a sine function. Accordingly, the portion of the reference signal in the second composite signal is phase shifted relative to the portion of the comparative signal in the second composite signal and is also phase shifted relative to the portion of the reference signal the in the first composite signal and relative to the portion of the comparative signal the in the first composite signal, however, the portion of the comparative signal in the first composite signal is not phase shifted relative to the portion of the comparative signal in the second composite signal.

The first light sensor 123 and the second light sensor 124 can be connected as a balanced detector and the first auxiliary light sensor 118 and the second auxiliary light sensor 120 can also be connected as a balanced detector. For instance, FIG. 6B provides a schematic of the relationship between the electronics, the first light sensor 123, the second light sensor 124, the first auxiliary light sensor 118, and the second auxiliary light sensor 120. The symbol for a photodiode is used to represent the first light sensor 123, the second light sensor 124, the first auxiliary light sensor 118, and the second auxiliary light sensor 120 but one or more of these sensors can have other constructions. In some instances, all of the components illustrated in the schematic of FIG. 6B are included on the one or more LIDAR chips. In some instances, the components illustrated in the schematic of FIG. 6B are distributed between the LIDAR one or more LIDAR chips and electronics located off of the one or more LIDAR chips.

The electronics connect the first light sensor 123 and the second light sensor 124 as a first balanced detector 125 and the first auxiliary light sensor 118 and the second auxiliary light sensor 120 as a second balanced detector 126. In particular, the first light sensor 123 and the second light sensor 124 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the first balanced detector as a second data signal. The first data signal and the second data signal are beating as a result of the beating between the comparative signal and the reference signal.

As a result of the above channel selections, the first data signal and the second data signal include unwanted signal components in addition to desired beat signals. However, the values of $\Delta f$ and df can be selected such that $\Delta f > (4N+1)df/2$ where N+1 represents the number of associated channel pairs for which LIDAR data is to be generated. When $\Delta f>(4N+1)df/2$, the unwanted signal components the first data signal and the second data signal have a frequency above the frequency of the desired beat signals. As a result, filtering can separate the unwanted signal components from the desired beat signals.

FIG. 6C illustrates the relationship between the channels and the frequencies in the first data signal. The desired beat signals associated with different wavelengths appear in separate channels in the frequency domain. The channel associated with channel i is centered at the frequency i(df). The maximum frequency for channel i is given by $i(df)+f_{max,\ i}$. Accordingly, the maximum frequency for the channel with the highest frequency (Channel i=N) is equal to $N(df)+f_{max,\ N}$. To avoid inter-channel interference, the value of df can be selected such that $df>2*f_{max,\ N}$.

The value of $f_{max,\ i}$ can be determined from $f_{max,\ i}=f_{dmax}+f_{rmax}=f_{dmax,i}+\tau_{max}*(B/T)$ where $f_{dmax,\ i}$ represents the maximum frequency shift due to the Doppler effect that channel i should experience in the LIDAR input signal and can be approximated as $\sim 2\times Vmax \times fc_i/c$ where Vmax represents the maximum in the absolute value of radial velocity level that should be seen by the LIDAR system, c represents speed of light, $f_{rmax}$ represents the max frequency shift due to separation between the source of the LIDAR output signal and the reflecting object, B/T represents the rate at which the frequency of channel i is increased or decreased during the data period, and $\tau_{max}$ represents the maximum delay that should occur between transmission of a LIDAR output signal and the receipt of the LIDAR input signal at the LIDAR chip. The values of variables such as B, T, $\tau_{max}$, and Vmax can be dependent on the application of the LIDAR system. In general, suitable values include, but are not limited to, B greater than 0.5 GHz and less than 25 GHz, T greater than 0.1 us and less than 10 us, $\tau_{max}$ greater than 0.1 us and less than 2 us, and Vmax greater than 0.0 m/s and less than 150 m/s. In an example of a self-driving car application, suitable values include, but are not limited to, B greater than 1 GHz and less than 10 GHz, T greater than 1 us and less than 2 us, $\tau_{max}$ greater than 0.7 us and less than 1.4 us, and Vmax greater than 100 m/s and less than 150 m/s. In an example of an Augmented Reality (AR) application, suitable values include, but are not limited to, B greater than 0.5 GHz and less than 5 GHz, T greater than 20 ns and less than 100 ns, $\tau_{max}$ greater than 15 ns and less than 80 us, and Vmax greater than 0 m/s and less than 0.5 m/s. In some instances, df is greater than 1, 2, or 5 times the value of $2*f_{max,\ N}$.

Although FIG. 6C is disclosed as representing the frequencies in the first data signal, FIG. 6C can also represent the frequencies in the second data signal. Accordingly, the values of $BW_i$ and $f_{max,\ i}$ associated with the first data signal can be the same for the second data signal.

During each data period, the LIDAR data is generated for a sample region by providing the first data signal to a first Analog-to-Digital Converter (ADC) and the second data signal to a second Analog-to-Digital Converter (ADC). The resulting digital signals can then be provided to a transform component 168 configured to perform a complex transform on a complex data signal so as to convert the input from the time domain to the frequency domain. The first data signal can be the real component of the complex data signal and the second data signal can be the imaginary component of the complex data signal. The transform component 168 can execute the attributed functions using firmware, hardware and software or a combination thereof. The transform converts the input from the time domain to the frequency domain. Accordingly, the transform component can output one or more frequencies the each corresponds to an object in the sample region illuminated by the LIDAR output signal. Each of the different frequencies is used by the electronics as the frequency of the LIDAR input signal. The electronics can use the frequencies for further processing to determine the distance and/or velocity of each of the one or more reflecting objects in the sample region. Different objects in a sample region need not be physically separate items but can be different surfaces of the same item that are located different distances from the LIDAR system and/or are moving at different radial velocities relative to the LIDAR system as might occur with a jagged object that is both rotating and translating relative to the LIDAR system.

One issue with the use of Analog-to-Digital Converters (ADC) on the first data signal and/or on the second data signal may be that the ADC sampling rate required to generate useful results may be impractical to achieve. Another option is to separate the different channels in the first data signal and the second data signal before converting from analog to digital.

FIG. 6C includes a schematic of electronics that are suitable for use with a processing unit constructed according to FIG. 6A. The first data line 128 carries the first data signal to N+1 data processing branches 240 that are each associated with one of the channels. Each of the N+1 data processing branches 240 can correspond to one of the N+1 comparative channels and accordingly to one of the LIDAR output signals that is concurrently incident on a sample region. As N becomes larger, it may be desirable to place an optional amplifier 242 along the first data line 128 to amplify to the power of the first data signal to a power level that is sufficient power for processing of the first data signal by the N+1 data processing branches 240. The second data line 132 carries the second data signal to the N+1 data processing branches 240 that are each associated with one of the channels. As N becomes larger, it may be desirable to place an optional amplifier 242 along the second data line 132 to amplify to the power of the second data signal to a power level that is sufficient power for processing of the second data signal by the N+1 data processing branches 240.

In the data processing branches 240 for channels i>0, the first data line 128 carries the first data signal to a first multiplier 244 that multiplies the first data signal by a first multiplier signal. The first multiplier signal is selected to shift the frequencies associated with channel i>0 in the first data signal to a lower frequency. In the example of FIG. 6C, the first multiplier signal is selected to shift the frequencies associated with channel i>0 such that the band $BW_i$ is centered at the zero frequency. Accordingly, the first multiplier signal can be represented by $\cos(2\pi(i)(df)t)$. Each of the first multipliers outputs a first-frequency shifted data signal. Suitable first multipliers include, but are not limited to, RF mixers such as a Gilbert cell mixer.

In the data processing branches 240 for channels i>0, the second data line 132 carries the second data signal to a second multiplier 146 that multiplies the second data signal by a second multiplier signal. The second multiplier signal is selected to shift the frequencies associated with channels i>0 in the second data signal to a lower frequency. In some instances, the frequencies associated with each channel i>0 in the second data signal are shifted to the same frequency as the associated channel i in the first data signal. In the example of FIG. 6C, the second multiplier signal is selected to shift the frequencies associated with channel i>0 such that the band $BW_i$ is centered at the zero frequency. Accordingly, the second multiplier signal can be represented by $\sin((\pi/$ 2)+2π(i)(df)t). Each of the second multipliers outputs a second frequency-shifted data signal. Suitable second multipliers include, but are not limited to, RF mixers such as a Gilbert cell mixer.

The first frequency-shifted data signals and the second frequency-shifted data signals are each received on a filter input line 250 that each carries the received signal to a filter 252. In the above discussions, the frequencies associated with channels i>0 are shifted so as to be centered at a frequency of 0.0. However, the frequencies associated with the channel i=0 in the first data signal are already centered at a frequency of 0.0. As a result, the first data line 128 can carry the first data signal to a filter 152 without the first data signal being processed by a multiplier. Additionally, the frequencies associated with the channel i=0 in the second data signal are already centered a frequency of 0.0. As a result, the second data line 132 carries the second data signal to a filter 252 without the second data signal being processed by a multiplier.

The filters 252 in each of the data processing branches 240 are configured to pass the frequencies in a frequency band centered at zero-frequency while filtering out other frequency bands. Since the first frequency-shifted data signals in the data processing branch 240 associated with channel i have the frequency band for channel i centered at a zero frequency, each filter 152 outputs a first channel data signal that includes the LIDAR data associated with channel i but does not include or substantially include LIDAR data for the channels below channel i (<i) or above channel i (>i). Since the second frequency-shifted data signals in the data processing branch 240 associated with channel i have the frequency band for channel i centered at a zero frequency, each filter 252 outputs a second channel data signal that includes the LIDAR data associated with channel i but does not include or substantially include LIDAR data for the channels below channel i (<i) or above channel i (>i). Suitable filters for use as the first filters and/or second filters include, but are not limited to, lowpass filters because the first frequency-shifted data signals and the second frequency-shifted data signals are centered at zero-frequency.

The first channel data signals and the second channel data signals are each received on an ADC input line 254 that each carries the received signal to an Analog-to-Digital Converter 256 (ADC). According to the Nyquist sampling theorem, the sampling rate for an Analog-to-Digital Converters (ADC) is generally greater than or equal to twice the highest frequency in the signal. Accordingly, if the frequency arrangement were as shown in FIG. 6C, the sampling rate for channel i would be greater than or equal to $2*(i(df)+f_{max, i})$. In FIG. 6C, the signal i would be considered oversampled when the sampling rate is greater than $2*(i(df)+f_{max, i})$ and undersampled when sampling rate is less than $2*(i(df)+f_{max, i})$. However, because the multipliers reduced the frequency of the channels, the frequency band of the first channel data signals and the second channel data signals are not arranged as shown in FIG. 6C but have been reduced such that the highest frequency for each first channel data signal and each second channel data signal is less than or equal to $f_{m}ax, N$ in FIG. 6C. Accordingly, the sampling rate for each Analog-to-Digital Converter 256 can be greater than or equal to twice $2*f_{max, N}$. As a result, the down conversion provided by the multiplier reduces the sampling rate required for each Analog-to-Digital Converter 256. The Analog-to-Digital Converters 256 that each receives a first channel data signal outputs a first digital data signal. The Analog-to-Digital Converters 256 that each receives a second data signal outputs a second digital data signal. The first digital data signals and the second digital data signals are each received on a digital data line 258. Each digital data line carries the received signal to a transform component 260.

The transform components 260 are arranged such that each transform component 260 receives one of the first digital data signals and the associated second digital data signal. Additionally, each of the transform components 260 is associated with a different one of the channels. The transform components 260 associated with channel i receives the first digital data signal for channel i and also receives the second digital data signal for channel i.

The transform components 260 are configured to perform a complex transform on a complex data signal so as to convert the input from the time domain to the frequency domain. The first digital data signal can be the real component of the complex data signal and the second digital data signal can be the imaginary component of the complex data signal. The transform components can execute the attributed functions using firmware, hardware and software or a combination thereof.

The Complex Fourier transform converts the input from the time domain to the frequency domain and outputs one or more frequencies that each corresponds to an object in the sample region illuminated by the LIDAR output signal. Each of the different frequencies is used by the electronics as a frequency for the LIDAR input signal associated with channel i. The electronics can use the frequencies for further processing to determine the distance and/or velocity of each of the one or more reflecting objects in the sample region.

The electronics can use the one or more frequencies output from each of the transform components to determine the LIDAR data (the radial velocity and/or the distance between a reflecting object in the sample region and the source of the LIDAR output signal) for each of the one or more objects in the sample region. Consider an example where the laser sources concurrently output two channels (i=0 and i=1) that are modulated such that channel i=0 results in a LIDAR output signal with a frequency that increases linearly during the data period and channel i=1 results in a LIDAR output signal with a frequency that decreases linearly during the data period. The two channels concurrently illuminate the same sample region. The following equation applies when the frequency of the LIDAR output signals increases during the data period as occurs with channel i=0: $f_{ub}=-f_d+\alpha^{\tau_0}$ where $f_{ub}$ is the frequency provided by the transform component associated with channel i=0, $f_d$ represents the Doppler shift ($f_{d,i}=2vf_c/c$) where v is the radial velocity between the reflecting object and the LIDAR chip where the direction from the reflecting object toward the LIDAR chip is assumed to be the positive direction, and c is the speed of light, α is the rate at which the frequency is changed during the data period, and r is the roundtrip delay between transmission of a LIDAR output signal and receipt of the corresponding LIDAR input signal. The following equation applies when the frequency of the LIDAR output signals decreases during the data period as occurs with channel i=1: $f_{db}=-f_d-\alpha^{\tau_0} r$ where $f_{db}$ is a frequency provided by the transform component associated with channel i=1. When these two equations are applied to the above example for channels i=0 and i=1, the only unknowns in these two equations are $f_d$ and $\tau_0$. As a result, the electronics solve these two equations for $f_d$ and $\tau_0$. The radial velocity can then be determined from the Doppler shift as $v=c*f_d/(2f_c)$ and the separation distance can be determined from $c*\tau_0/2$.

When more than one object is present in a sample region, the transform components may output more than one frequency. For instance, in the above example for channels $i=0$ and $i=1$, the transform component for channel $i=0$ may output more than one frequency and the transform component for channel $i=1$ may output more than one frequency. The frequencies from the transforms in different processing components 34 that are a result of reflection by the same reflecting object can be matched as disclosed in the context of FIG. 1A through FIG. 3C.

Each set of matching frequencies can be used in the above equations to generate LIDAR data. As noted above, the LIDAR data generated from each set of matching frequencies will be for one of the objects in the sample region allowing LIDAR data values to be generated for multiple reflecting objects in the sample region.

Figure 6D:
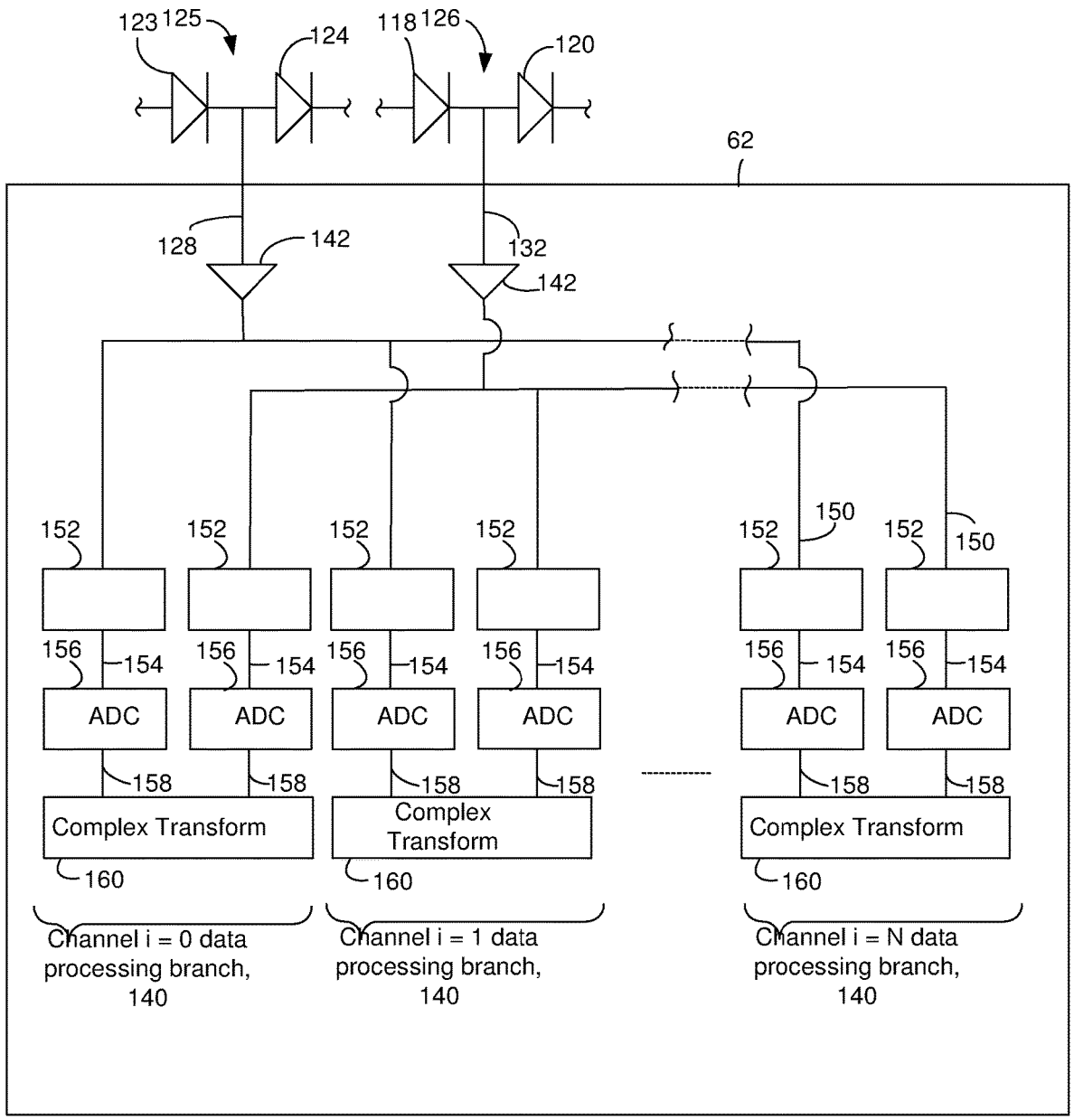
FIG. 6D illustrates a schematic for another example of electronics that are suitable for use with a processing unit constructed according to FIG. 6A.
Figure 7A:
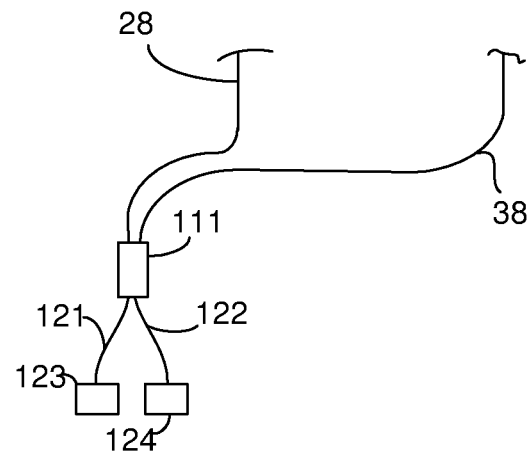
FIG. 7A through FIG. 7C illustrate an example of suitable processing component for use in a LIDAR system constructed according to FIG. 4.
Figure 7B:
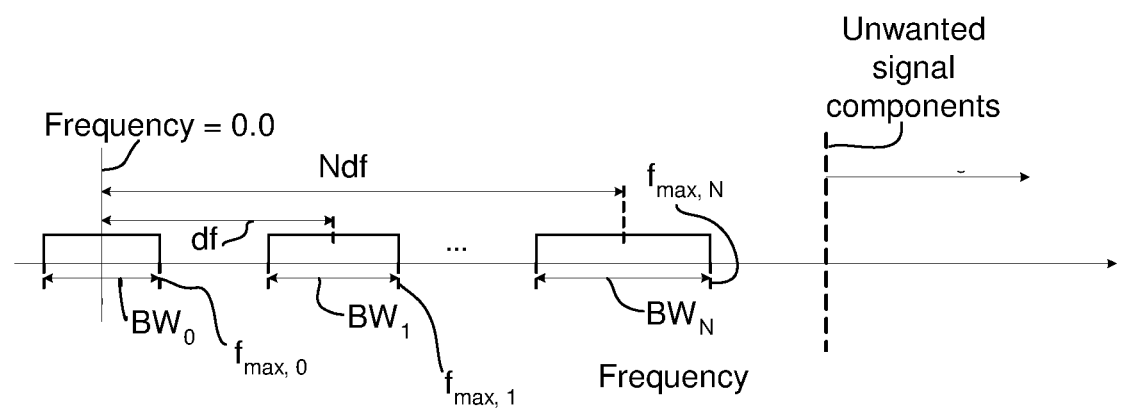
Figure 7C:
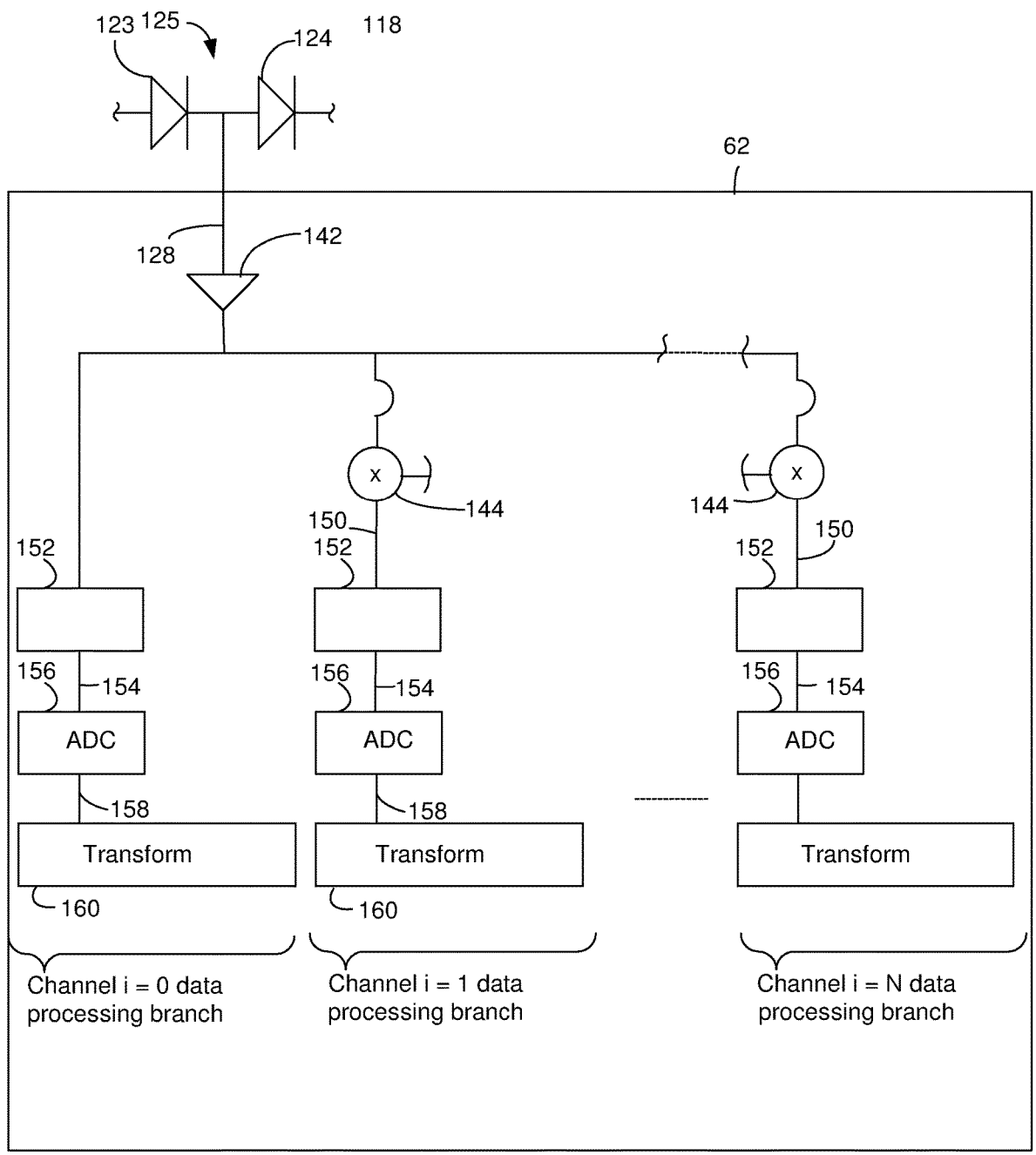
Figure 7D:
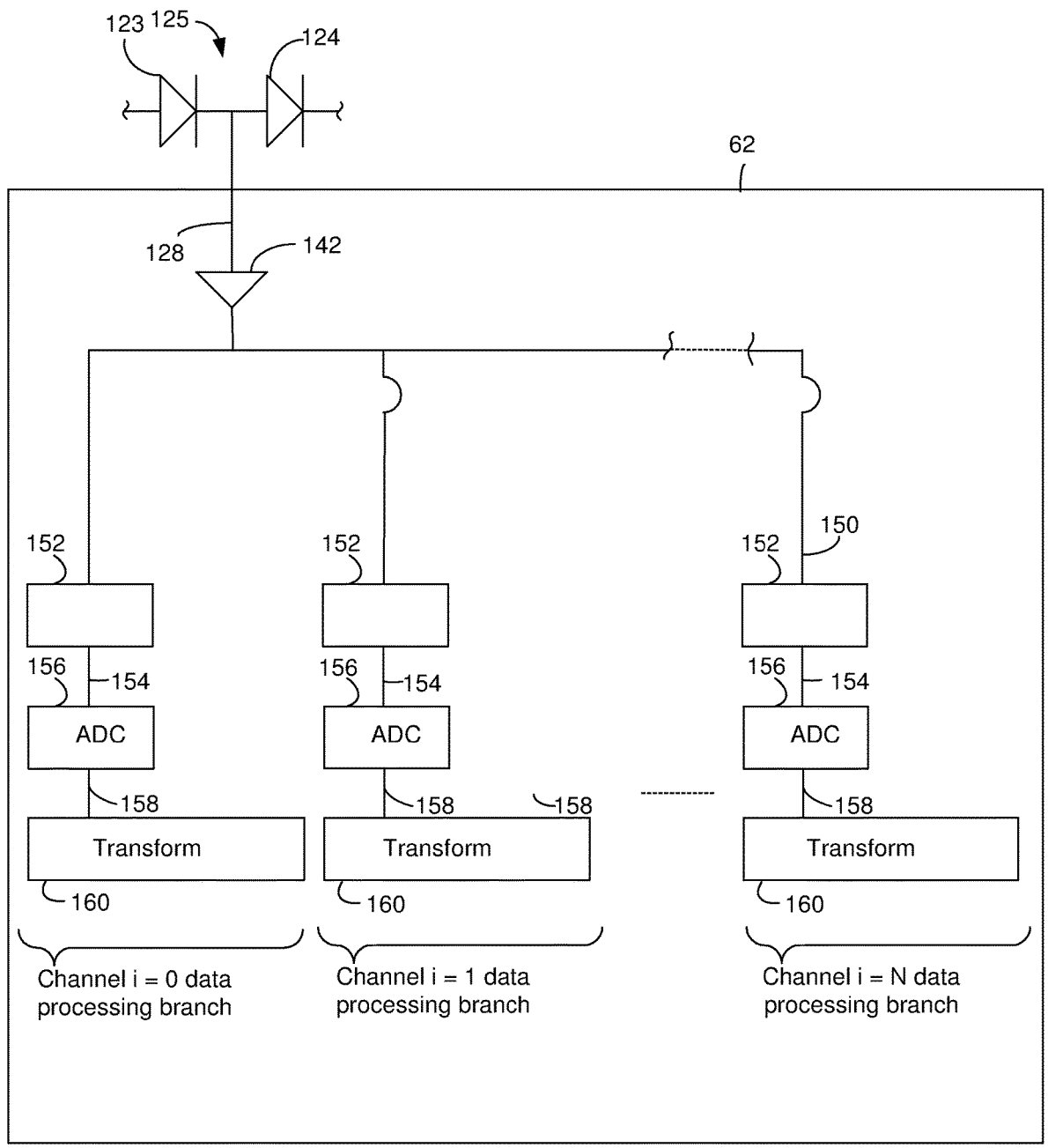
FIG. 7D illustrates a schematic for another example of electronics that are suitable for use with a processing unit constructed according to FIG. 7A.

FIG. 6D includes another example of schematic of electronics that are suitable for use with a processing unit constructed according to FIG. 6A. The first data line 128 carries the first data signal to N+1 data processing branches 240 that are each associated with one of the channels. As N becomes larger, it may be desirable to place an optional amplifier 242 along the first data line 128 to amplify to the power of the first data signal to a power level that is sufficient power for processing of the first data signal by the N+1 data processing branches 240. The second data line 132 carries the second data signal to the N+1 data processing branches 240 that are each associated with one of the channels. As N becomes larger, it may be desirable to place an optional amplifier 242 along the second data line 138 to amplify to the power of the second data signal to a power level that is sufficient power for processing of the second data signal by the N+1 data processing branches 240.

The first data line 128 carries the first data signal to a different filter 252 located in each of the data processing branches 240. Additionally, the second data line 132 carries the second data signal to a different filter 252 located in each of the data processing branches 240. The filters 252 in each data processing branch i are configured to pass the frequencies that fall within bandwidth i ($BW_i$) while filtering out frequencies that fall within bandwidths $>i$ ($BW_{>i}$) and bandwidths $<i$ ($BW_{<i}$). As a result, the filters 252 in data processing branch i that receive a first data signal output a first channel data signal that includes the LIDAR data associated with channel i but does not include or substantially include LIDAR data for the channels below channel i ($<i$) or above channel i ($>i$). Additionally, the filter 252 in data processing branch i that receive a second data signal output a second channel data signal that includes the LIDAR data associated with channel i but not include or substantially include LIDAR data for channels below channel i ($<i$) or above channel i ($>i$).

Suitable filters 252 for use as the filter 252 in the data processing branch associated with channel $i=1$ can be a lowpass filter because the frequencies in $BW_i$ are centered around the zero frequency. Suitable filters 252 for use as the filter 252 in the data processing branch associated with channel $i>1$ can be bandpass filters because the frequencies in $BW_i$ are higher than the zero frequency.

The first channel data signals and the second channel data signals are each received on an ADC input line 254 that each carries the received signal to an Analog-to-Digital Converter 256 (ADC). According to the Nyquist sampling theorem, the sampling rate for an Analog-to-Digital Converters (ADC) is generally greater than or equal to twice the highest frequency in the signal. Accordingly, in FIG. 6C, the signal i would be considered oversampled when the sampling rate is greater than $2*(i(df)+f_{max, i})$ and undersampled when sampling rate is less than $2*(i(df)+f_{max, i})$. In the system of FIG. 6D, at least a portion of the first channel data signals and the second channel data signals are undersampled. For instance, the Analog-to-Digital Converters (ADC) for the first channel data signals and the second channel data signals associated with at least channels $i>0$ are undersampled. Undersampling the first channel data signal for channel i causes an ADC to output a first digital signal that includes the frequencies of BWi shifted to the zero-frequency. Undersampling the second channel data signal for channel i causes an ADC to output a second digital signal that includes the frequencies of BWi shifted to the zero-frequency.

The undersampling rate can be selected based on the bandwidth of the channel $i=N$ in the first data signal. For instance, the sampling rate for each Analog-to-Digital Converter 256 can be greater than or equal to $f_{max, 0}$ and less than or equal to $f_{max, N}$. As a result, the electronics of FIG. 6D can reduce the required sampling rates to the levels achieved with the down conversion provided by the electronics of FIG. 6C.

The first digital data signals and the second digital data signals are each received on a digital data line 258. Each digital data line carries the received signal to a transform component 260. The transform components 260 are arranged and operated as disclosed in the FIG. 6A through FIG. 6C to generate LIDAR data for a sample region and/or to generate multiple LIDAR data values when there are multiple objects located in a sample region.

In some instances, a simplified version of the processing components 34 of FIG. 6A through FIG. 6D can be employed. For instance, the processing components 34 of FIG. 6A through FIG. 6D are simplified in FIG. 7A through FIG. 7D. The comparative signal carried on the comparative waveguide 28 and the reference signal carried on the reference signal waveguide 38 are carried to a light-combining component 111. The light-combining component 111 operates as disclosed above and outputs the first portion of the first composite signal and the second portion of the first composite signal as disclosed above. The remaining components operate on the first portion of the first composite signal and the second portion of the first composite signal as disclosed in the context of FIG. 6A through FIG. 6D to generate the first digital data signals that are each associated with one of the channels. The first digital data signals are each received on a digital data line 258. Each digital data line carries the received signal to a transform component 260.

The transform components 260 can perform a real transform on the first digital data signals so as to convert the input from the time domain to the frequency domain. Examples of suitable transforms include a real Fourier transform that converts the input from the time domain to the frequency domain. The transform can output multiple frequency peaks and the electronics can select which frequency peaks to be used as representing the frequency of the LIDAR input signal for comparative channel i. The electronics use the selected frequency for further processing to determine the LIDAR data. The processing components 34 disclosed in the context of FIG. 7A through FIG. 7D are most suitable for use when the source of the LIDAR signal and reflecting object have a radial velocity and radial separation within known ranges and the frequency solutions within those ranges have results that allow the correct frequency solutions to be selected.

The balanced detectors can be replaced with other light sensors that convert light signals to electrical signals. For instance, a single photodiode or other light sensor can serve as one or more of the above balanced detectors. In these instances, the associated light-combining components need not split the composite signal(s) into multiple portions. Alternately, the light signals can be converted to electrical signals earlier than is illustrated above. As a result, the electronics can combine electrical signals so as to form an electrical equivalent to the composite signal(s) disclosed above.

The LIDAR systems of FIG. 4 through FIG. 7D disclose the frequency of each comparative channel as equal to the frequency of the corresponding reference channel plus a separation factor, however, the LIDAR systems of FIG. 4 through FIG. 7D can also be operated with the reverse channel frequency assignments. For instance, the frequency of each reference channel can be equal to the frequency of the corresponding comparative channel plus the separation factor. As an example, the frequency of reference channel with channel index i ($fr_i$) can be $fr_i = fc_i + (i)df$ or $fr_i = fc_i + (i+1)$ the frequency of comparative channel i ($fc_i$) can be $fc_i = f_o + (i)\Delta f$. The reference channels can each be associated with one of the comparative channels. The comparative channel and the associated reference channel can be an associated channel pair that are each associated with the same channel index i. The frequency of each comparative channel can be equal to the frequency of the corresponding reference channel plus a separation factor that can be positive or negative. As a result, the reference channel and the associated comparative channel have the same base frequency. The separation factor is selected to be different for each pair of associated channels. For instance, the frequency of comparative channel with channel index i ($fc_i$) can be $fc_i = fr_i + (i)df$ or $fc_i = fr_i + (i+1)df$ where i is an integer greater than or equal to 0, $fr_i$ represents the frequency of reference channel i, df represents the increase in the separation factor for adjacent comparative channels and ((i)df or (i+1)df) represents the separation factor for comparative channel i. The frequencies of the reference channels can also be different. In some instances, the frequencies of the reference channels increase linearly. For instance, the frequency of reference channel i ($fr_i$) can be $fr_i = f_o + (i)\Delta f$ where $f_o$ represents the frequency of reference channel i=0, $\Delta f$ represents the increase in the separation factor for adjacent reference channels and ($f_o + (i)\Delta f$) represents the base frequency for comparative channel i and reference channel i.

Above, the complex data signals are described as having an in-phase component and a quadrature component that include out-of-phase portions of the reference signal; however, the unambiguous LIDAR data solution can be achieved by generating other complex data signals. For instance, the unambiguous LIDAR data solution can be achieved using a complex data signal where the in-phase component and the quadrature component include out-of-phase portions of the comparative signal. For instance, the first comparative waveguide 104 and the second comparative waveguide 106 can be constructed so as to provide a 90 degree phase shift between the first portion of the comparative signal and the second portion of the comparative signal with the first reference waveguide 110 and the second reference waveguide are constructed such that the first portion of the reference signal and the second portion of the reference signal are in-phase in the composite signals. Accordingly, the portion of the comparative signal in the first composite signal is phase shifted relative to the portion of the comparative signal in the second composite signal, however, the portion of the reference signal in the first composite signal is not phase shifted relative to the portion of the reference signal in the second composite signal.

The LIDAR systems of FIG. 4 through FIG. 7D use channel assignments that start channel i=0 through channel N for a total of N+1 channels. However, the channel indices can be shifted. For instance, the channel index can be configured such that the channels start at channel j=1 through channel M for a total of M channels. Such a shift can be performed by substituting i=j−1 into the above equations.

The disclosed LIDAR systems convert light signals that carry the LIDAR data to electrical signals and then operate on the electrical signals so as to generate the LIDAR data. However, the LIDAR systems can separate the LIDAR data carried on different LIDAR input signals optically or electrically. For instance, the LIDAR system disclosed in the context of FIG. 1A through FIG. 3D separate an optical signal that carries LIDAR data from multiple LIDAR input signals into multiple optical signals that each carries LIDAR data from a single LIDAR input signal. In contrast, the LIDAR system disclosed in the context of FIG. 4 through FIG. 7D separate an electrical signal that carries LIDAR data from multiple LIDAR input signals into multiple electrical signals that each carries LIDAR data from a single LIDAR input signal. Accordingly, some of the disclosed LIDAR systems convert light signals that carry the LIDAR data to electrical signals and then separate electrical signals in order to separate the LIDAR data.

Suitable output components 26 for use in the LIDAR systems of FIG. 4 through FIG. 7D can be waveguide facets. For instance, FIG. 8A is a topview of a portion of a LIDAR chip that includes the LIDAR signal waveguide 24 terminating at a facet 300 through which the LIDAR output signals exit the LIDAR chip and/or the LIDAR input signals enter the LIDAR chip.

In some instances, it is desirable to scan the LIDAR output signals to multiple different sample regions in the field of view so LIDAR data can be generated for the different sample regions. When the LIDAR signal waveguide 24 terminates at a facet 300, various scanning mechanisms can be used to scan the LIDAR output signals. For instance, the LIDAR output signals can be received by one or more reflecting devices and/or one more collimating devices. The one or more reflecting devices can be configured to re-direct and/or steer the LIDAR output signal so as to provide scanning of the LIDAR output signal. Suitable reflecting devices include, but are not limited to, mirrors such mechanically driven mirrors and Micro Electro Mechanical System (MEMS) mirrors. The one or more collimating devices provide collimation of the LIDAR output signal and can accordingly increase the portion of the LIDAR input signal that enters the LIDAR signal waveguide 24. Suitable collimating devices include, but are not limited to, individual lenses and compound lenses.

Figure 8A:
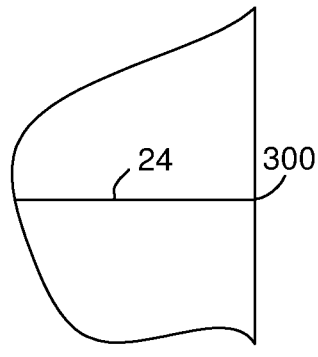
FIG. 8A illustrates a waveguide facet serving as an output component.
Figure 8B:
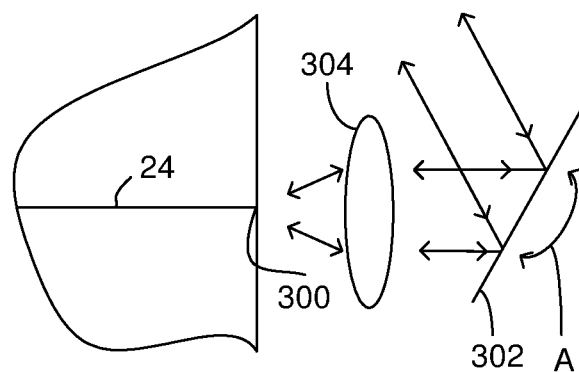
FIG. 8B illustrates the LIDAR chip of FIG. 8A used with an off-chip scanning mechanism.

FIG. 8B illustrates the portion of the LIDAR chip shown in FIG. 8A used with a reflecting device 302 and a collimating device 304. For instance, a lens serves as a collimating device that receives the LIDAR output signals and provides collimation of the LIDAR output signals. A mirror serves as a reflecting device 302 that receives the collimated LIDAR output signals and reflects the collimated LIDAR output signals in the desired direction. As is illustrated by the arrow labeled A, the electronics can move the mirror so as to steer the collimated LIDAR output signals and/or scan the collimated LIDAR output signals. The movement of the mirror can be in two dimensions or three dimensions. Suitable mirrors include, but are not limited to, mechanically driven mirrors and Micro Electro Mechanical System (MEMS) mirrors.

Figure 8C:
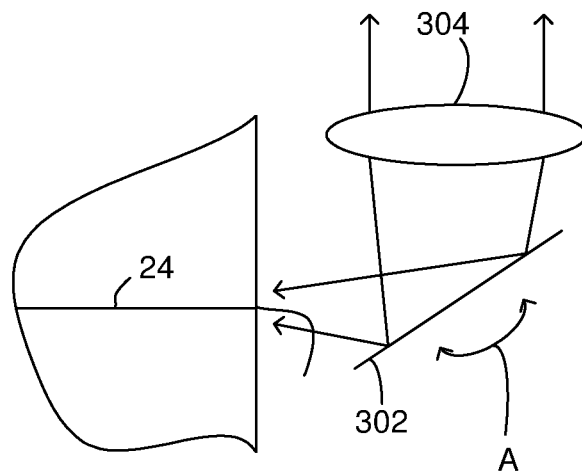
FIG. 8C illustrates the LIDAR chip of FIG. 8A used with another embodiment of an off-chip scanning mechanism.

FIG. 8C illustrates the portion of the LIDAR chip shown in FIG. 8A used with a reflecting device 302 and a collimating device 304. For instance, a mirror serves as a reflecting device 302 that receives the LIDAR output signals and reflects the LIDAR output signals in the desired direction. As is illustrated by the arrow labeled A, the electronics can move the mirror so as to steer the LIDAR output signals and/or scan the LIDAR output signals. A lens serves as a collimating device 304 that receives the LIDAR output signals from the mirror and provides collimation of the LIDAR output signals. The lens can be configured to move with the movement of the mirror so the lens continues to receive the LIDAR output signals at different positions of the mirror. Alternately, the movement of the mirror can be sufficiently limited that the lens continues to receive the LIDAR output signals at different positions of the mirror. The movement of the mirror can be in two dimensions or three dimensions. Suitable mirrors include, but are not limited to, mechanically driven mirrors and Micro Electro Mechanical System (MEMS) mirrors.

Figure 9:
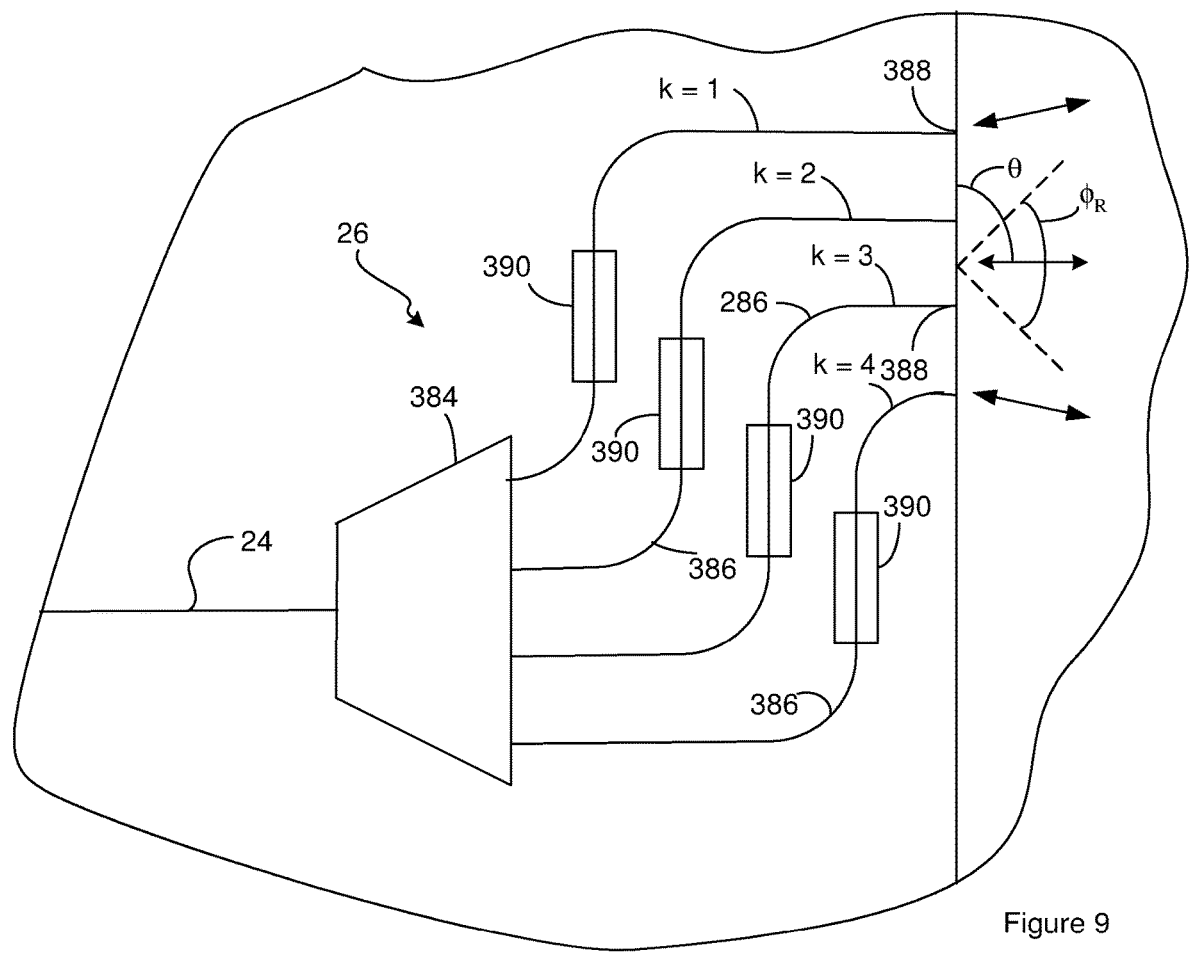
FIG. 9 illustrates an example of an output component that optionally includes beam steering capability.

FIG. 9 illustrates an example of a suitable output component 26 that can optionally include beam steering capability. The output component 26 includes a splitter 384 that receives the outgoing light signal from the LIDAR signal waveguide 24. The splitter 384 divides the outgoing light signal into multiple output signals that are each carried on a steering waveguide 386. Each of the steering waveguides ends at a facet 388. The facets are arranged such that the output signals exiting the LIDAR chip through the 388 facets combine to form the LIDAR output signals.

The splitter 384 and steering waveguides 386 can be constructed such that there is not a phase differential between output signals at the facet of adjacent steering waveguides. For instance, the splitter can be constructed such that each of the output signals is in-phase upon exiting from the splitter and the steering waveguides can each have the same length. The lack of a phase differential between the output signals causes each of the channels in the outgoing LIDAR signal to travel away from the output component 26 in the same direction (0). Suitable numbers of steering waveguides 386 (M) include, but are not limited to, M greater than 10, or 500 and/or less than 1000, or 2000. Suitable splitters include, but are not limited to, star couplers, cascaded Y-junctions and cascaded 1×2 MMI couplers.

In some instances, a phase tuner 390 is optionally positioned along at least a portion of the steering waveguides. Although a phase tuner is shown positioned along the first steering waveguide and the last steering waveguide, one or both of these phase tuners are optional. For instance, the output component 26 need not include a phase tuner on steering waveguide k=1.

The electronics can be configured to operate the phase tuners 390 so as to create a phase differential between the output signals at the facet of adjacent steering waveguides 386. The electronics can operate the phase tuners 390 such that the phase differential is constant in that it increases linearly across the steering waveguides. For instance, electronics can operate the phase tuners such that the tuner-induced phase of steering waveguide number k is $(k-1)\beta$ where k is an integer from 1 to M and represents the number associated with a steering waveguide when the steering waveguides are sequentially numbered as shown in FIG. 9, $\beta$ is the tuner-induced phase differential between neighboring steering waveguides. Accordingly, the phase of steering waveguide number k is $f_o+(k-1)f+(k-1)\beta$. FIG. 9 illustrates the chip having only 4 steering waveguides in order to simplify the illustration, however, the chip can include more steering waveguides. For instance, the chip can include more than 4 steering waveguides, more than 100 steering waveguides, or more than 1000 steering waveguides and/or less than 10000 steering waveguides.

The electronics can be configured to operate the phase tuners 390 so as to tune the value of the phase differential R. Tuning the value of the phase differential $\beta$ changes the direction that the LIDAR output signals travel away from the chip ($\theta$). Accordingly, the electronics can scan the LIDAR output signals by changing the phase differential $\alpha$. The range of angles over which the LIDAR output signal can be scanned is $\phi_R$ and, in some instances, extends from $\phi_v$ to $-\phi_v$ with $\phi=0°$ being measured in the direction of the LIDAR output signal when $\beta=0$.

In addition to creating the phase differential or as an alternative to creating the phase differential, the phase tuners 390 can be operated so as to collimate or focus the LIDAR output signals. For instance, the phase tuners 390 can be operated such that there is a constant phase differential $\beta$ induced between the successive waveguides so that the induced phase for waveguide k is $\varphi_k=(k-1)\beta$, where $\beta$ is a constant in the case a collimated beam. For a focused beam, as suitable nonlinear phase dependence can be induced.

Additional details about the construction and operation of a output component 26 constructed according to FIG. 9 can be found in U.S. Provisional Patent Application Ser. No. 62/680,787, filed on Jun. 5, 2018, and incorporated herein in its entirety.

There may be some spreading of the different LIDAR output signals in the outgoing LIDAR signal as they travel away from the output component 26. Because the LIDAR output signals are directed to the same sample region, the degree of separation can be such that the spot size of each of the LIDAR output signals is overlapped by at least one of the other LIDAR output signals by more than an overlap threshold percentage at the maximum distance for which the LIDAR system is configured to provide LIDAR data. As noted above, the maximum distance is commonly set by the specifications of the application to which the LIDAR system is being applied. An example of circumstances where there may be some spreading of the different LIDAR output signals in the outgoing LIDAR signal as they travel away from the output component 26 is when the path length difference between steering waveguide 386 is non-zero.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a LIDAR system configured to output multiple LIDAR output signals that are each concurrently directed to a sample region in a field of view such that a spot size of each of the LIDAR output signals is overlapped by at least one of the other LIDAR output signals at a maximum distance for which the LIDAR system is configured to provide LIDAR data, the sample region being one of multiple sample regions included in the field of view;
the LIDAR system configured to concurrently receive multiple LIDAR input signals that have each been reflected by an object located outside of the LIDAR system and within the sample region, the LIDAR input signals each including light from a different one of the LIDAR output signals;

the LIDAR system including light combiners that are each configured to combine one of the LIDAR input signals with a reference signal that includes light that has not exited from the LIDAR system so as to generate a beating signal, each of the beating signals being generated from a different one of the LIDAR input signals, and the beating signals each beating at a beat frequency; and the LIDAR system including electronics configured to perform a mathematical transform on each of the beating signals and to calculate LIDAR data for the sample region from the beat frequencies of multiple of the beating signals, the LIDAR data indicating a distance and/or a radial velocity between the LIDAR system and the object.

2. The system of claim 1, wherein the electronics are configured to perform the mathematical transforms so as to identify a value of the beat frequency for each of the beating signals and the values of the beat frequencies are variables in equations that the electronics use to calculate the LIDAR data.

3. The system of claim 2, wherein the mathematical transforms are Fourier transforms.

4. The system of claim 3, wherein the Fourier transforms are each transform is a complex Fourier transform.

5. The system of claim 4, wherein the beating signals are each a complex data signal that includes a first data signal as the real component of the complex data signal and a second data signal as an imaginary component of the complex data signal.

6. The system of claim 5, wherein the first data signal is a composite of a first waveform and a second waveform and the second data signal is a composite of the first waveform and the second waveform, the portion of the first waveform in the first data signal being phase-shifted relative to the portion of the first waveform in the first data signal but the portion of the second waveform in the first data signal being in-phase relative to the portion of the second waveform in the first data signal.

7. A method of operating a LIDAR system, comprising:
concurrently illuminating a sample region in a field of view with multiple LIDAR output signals such that a spot size of each of the LIDAR output signals is overlapped by at least one of the other LIDAR output signals at a maximum distance for which the LIDAR system is configured to provide LIDAR data, the sample region being illuminated by the multiple LIDAR output signals for a data period, the sample region being one of multiple sample regions included in the field of view;

receiving multiple LIDAR input signals that have each been reflected by an object located outside of the LIDAR system and within the sample region, the LIDAR input signals each including light from a different one of the LIDAR output signals;

combining each of the LIDAR input signals with a reference signal that includes light that has not exited from the LIDAR system so as to generate beating signals, each of the beating signals being generated from a different one of the LIDAR input signals, and each of the beating signals beating at a beat frequency;

performing multiple mathematical transforms, each transform being performed on a different one of the beating signals; and calculating LIDAR data for the sample region from the beat frequencies of multiple of the beating signals, the LIDAR data indicating a distance and/or a radial velocity between the LIDAR system and the object.

8. The method of claim 7, wherein each transform is performed so as to identify a value for the beat frequency of a different one of the beating signals and the values of the beat frequencies are variables in an equation that the electronics use to calculate the LIDAR data.

9. The method of claim 8, wherein the mathematical transforms are each a Fourier transform.

10. The method of claim 9, wherein each of the Fourier transforms is a complex Fourier transform.

11. The method of claim 10, wherein the beating signals are each a complex data signal that includes a first data signal as the real component of the complex data signal and a second data signal as an imaginary component of the complex data signal.

12. The method of claim 11, wherein the first data signal is a composite of a first waveform and a second waveform and the second data signal is a composite of the first waveform and the second waveform, the portion of the first waveform in the first data signal being phase-shifted relative to the portion of the first waveform in the first data signal but the portion of the second waveform in the first data signal being in-phase relative to the portion of the second waveform in the first data signal.

13. The system of claim 1, wherein each of the LIDAR output signals travels away from the LIDAR system in the same direction.

14. The system of claim 1, wherein during the illumination of the sample region a frequency of different LIDAR output signals is chirped in different directions.

15. The method of claim 7, wherein each of the LIDAR output signals travels away from the LIDAR system in the same direction.

16. The method of claim 7, wherein during illumination of the sample region a frequency of different LIDAR output signals is chirped in different directions.

17. The system of claim 1, wherein each of the LIDAR input signals carries a channel at a different wavelength.

18. The system of claim 17, wherein the multiple of the beat frequencies from which the LIDAR data is calculated are generated from LIDAR input signals that each carries a different one of the channels.

19. The method of claim 7, wherein each of the LIDAR input signals carries a channel at a different wavelength.

20. The method of claim 19, wherein the multiple of the beat frequencies from which the LIDAR data is calculated are generated from LIDAR input signals that each carries a different one of the channels.

21. The system of claim 1, wherein the electronics are configured to calculate the distance between the LIDAR system and the object from the beat frequencies of the multiple beating signals.

22. The system of claim 1, wherein the electronics are configured to calculate the radial velocity between the LIDAR system and the object from the beat frequencies of the multiple beating signals.

23. The method of claim 7, wherein the electronics are configured to calculate the distance between the LIDAR system and the object from the beat frequencies of the multiple beating signals.

24. The method of claim 7, wherein the electronics are configured to calculate the radial velocity between the LIDAR system and the object from the beat frequencies of the multiple beating signals.

* * * * *